US012683763B2

(12) United States Patent
Seleznev et al.

(10) Patent No.: US 12,683,763 B2
(45) Date of Patent: Jul. 14, 2026

(54) COMPUTER-BASED SYSTEMS CONFIGURED TO SELECT A MONITORED DATA SEGMENTATION AND METHODS OF USE THEREOF

(71) Applicant: Capital One Services, LLC, McLean, VA (US)

(72) Inventors: Nikita Seleznev, Cambridge, MA (US); Christopher Bayan Bruss, Washington, DC (US); Chaya Glendon, McLean, VA (US); Senthil Kumar, Marlboro, NJ (US)

(73) Assignee: Capital One Services, LLC, McLean, VA (US)

( * ) Notice: Subject to any disclaimer, the term of this patent is extended or adjusted under 35 U.S.C. 154(b) by 250 days.

(21) Appl. No.: 18/400,253

(22) Filed: Dec. 29, 2023

(65) Prior Publication Data

US 2025/0219810 A1     Jul. 3, 2025

(51) Int. Cl.
*H04L 9/06*          (2006.01)
*H04L 9/00*          (2022.01)

(52) U.S. Cl.
CPC ............ *H04L 9/0643* (2013.01); *H04L 9/007* (2013.01)

(58) Field of Classification Search
CPC ... H04L 9/0643; H04L 9/007; H04L 63/1425; G06F 21/552
See application file for complete search history.

(56) References Cited

U.S. PATENT DOCUMENTS

| 7,610,330 | B1 * | 10/2009 | Quinn | ..................... H04L 45/02 |
| | | | | 709/201 |
| 2022/0114593 | A1 * | 4/2022 | Johnson | ................ G06F 18/214 |
| 2022/0329613 | A1 * | 10/2022 | Abbaszadeh | ....... H04L 63/1416 |
| 2024/0193165 | A1 * | 6/2024 | Spannhake, II | .... G06F 16/2477 |

OTHER PUBLICATIONS

Bhatia et al., "MStream: Fast Anomaly Detection in Multi-Aspect Streams," WWW21, Apr. 19-23, 2021, Ljubljana.
Sathe et al., Subspace Outlier Detection in Linear Time with Randomized Hashing, 2016 IEEE 16th International Conference on Data Mining, pp. 459-468.

* cited by examiner

*Primary Examiner* — Mohammed Waliullah
(74) *Attorney, Agent, or Firm* — GREENBERG TRAURIG, LLP

(57)          ABSTRACT

In some embodiments, the present disclosure provides an exemplary system and method that may include steps of identifying a device capable of processing a data stream; calculating a plurality of hash keys for a plurality of monitored segmentations associated with the device capable of the data stream; generating an increment data counter that corresponds to each hash key in a plurality of counting structures; calculating an anomaly score associated for the plurality of monitored segmentations; selecting a monitored segmentation based on the anomaly score; determining that a selected monitored segmentation meets a predetermined threshold associated with the anomaly score; and automatically marking the device capable of the data stream with a pre-generated label.

20 Claims, 17 Drawing Sheets

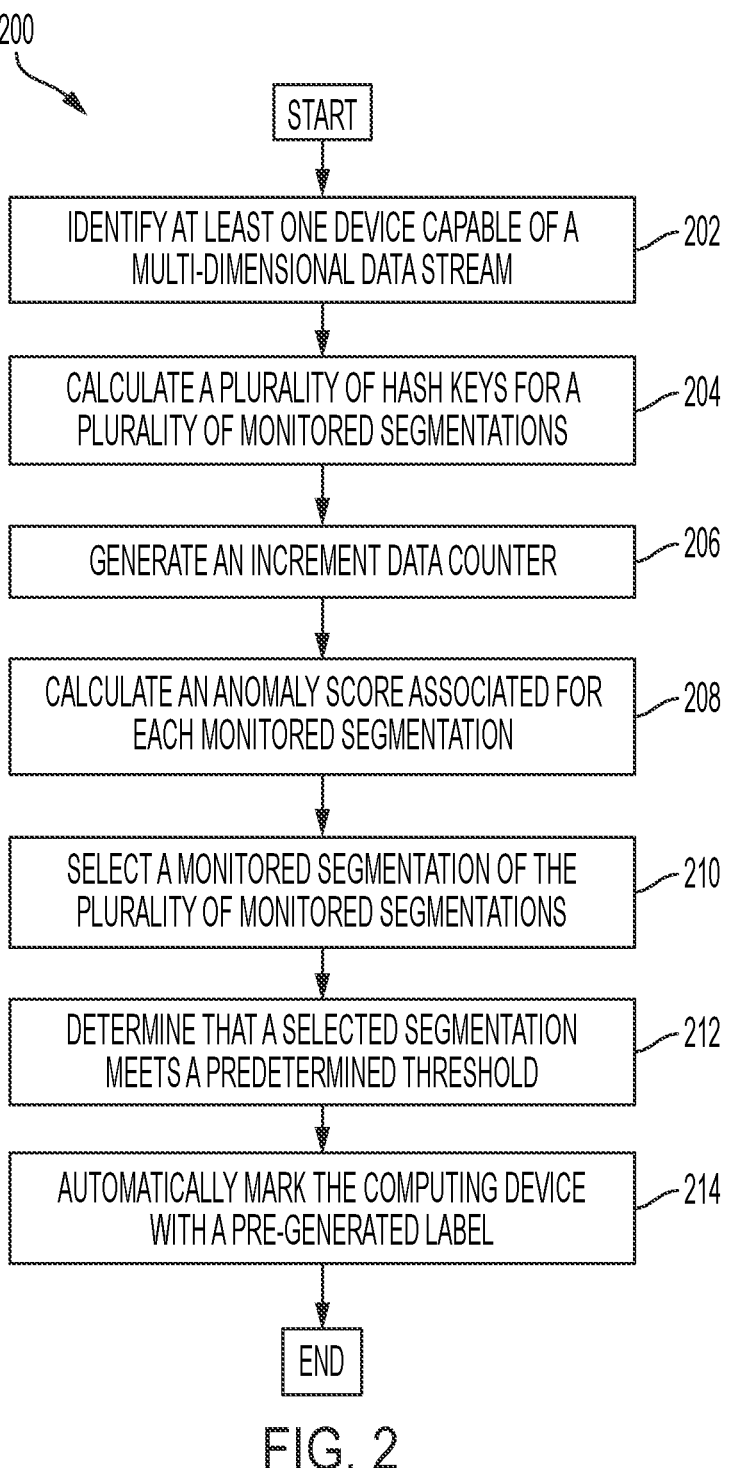

200

START

IDENTIFY AT LEAST ONE DEVICE CAPABLE OF A MULTI-DIMENSIONAL DATA STREAM — 202

CALCULATE A PLURALITY OF HASH KEYS FOR A PLURALITY OF MONITORED SEGMENTATIONS — 204

GENERATE AN INCREMENT DATA COUNTER — 206

CALCULATE AN ANOMALY SCORE ASSOCIATED FOR EACH MONITORED SEGMENTATION — 208

SELECT A MONITORED SEGMENTATION OF THE PLURALITY OF MONITORED SEGMENTATIONS — 210

DETERMINE THAT A SELECTED SEGMENTATION MEETS A PREDETERMINED THRESHOLD — 212

AUTOMATICALLY MARK THE COMPUTING DEVICE WITH A PRE-GENERATED LABEL — 214

END

FIG. 2

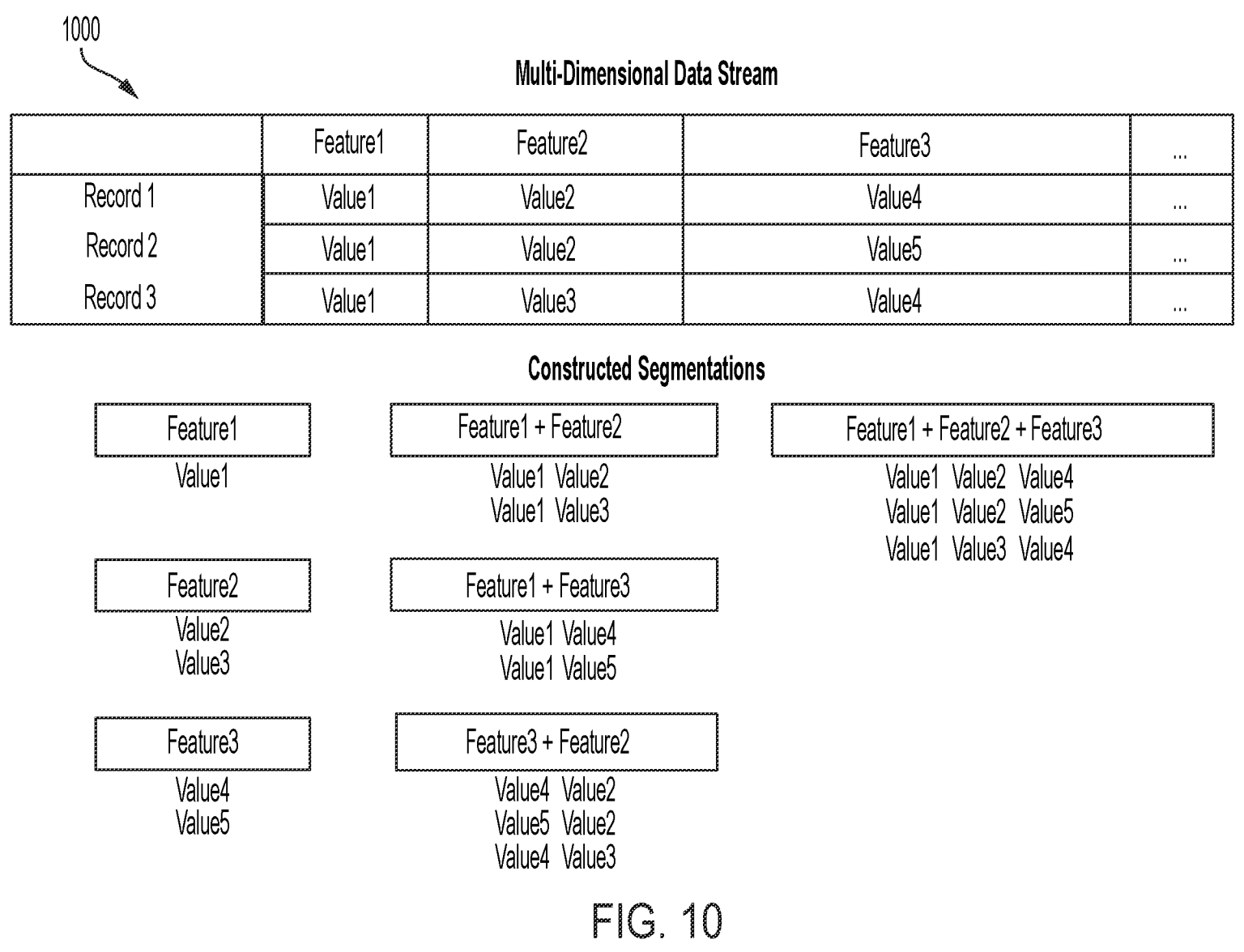

Multi-Dimensional Data Stream

| | Feature1 | Feature2 | Feature3 | ⋮ |
|---|---|---|---|---|
| Record 1 | Value1 | Value2 | Value4 | ⋮ |
| Record 2 | Value1 | Value2 | Value5 | ⋮ |
| Record 3 | Value1 | Value3 | Value4 | ⋮ |

1000

Constructed Segmentations

| Feature1 |
|---|
| Value1 |

| Feature2 |
|---|
| Value2 |
| Value3 |

| Feature3 |
|---|
| Value4 |
| Value5 |

| Feature1 + Feature2 |
|---|
| Value1 Value2 |
| Value1 Value3 |

| Feature1 + Feature3 |
|---|
| Value1 Value4 |
| Value1 Value5 |

| Feature3 + Feature2 |
|---|
| Value4 Value2 |
| Value5 Value2 |
| Value4 Value3 |

| Feature1 + Feature2 + Feature3 |
|---|
| Value1 Value2 Value4 |
| Value1 Value2 Value5 |
| Value1 Value3 Value4 |

FIG. 10

COMPUTER-BASED SYSTEMS CONFIGURED TO SELECT A MONITORED DATA SEGMENTATION AND METHODS OF USE THEREOF

FIELD OF TECHNOLOGY

The present disclosure generally relates to computer-based systems configured to select a monitored data segmentation and methods of use thereof.

BACKGROUND OF TECHNOLOGY

Typically, identity theft (IDT) fraud attacks are monitored through overall account volume spikes.

SUMMARY OF DESCRIBED SUBJECT MATTER

In some embodiments, the present disclosure provides an exemplary technically improved computer-based method that includes at least the following steps: identifying, by a processor, a device capable of processing a multi-dimensional data stream; dynamically calculating, by the processor, a plurality of hash keys for a plurality of monitored segmentations associated with the device capable of processing the multi-dimensional data stream; generating, by the processor, an increment data counter that corresponds to each hash value of the plurality of hash keys in a plurality of counting structures, where the plurality of counting structures include a current counting structure and a total counting structure for a given segmentation; dynamically calculating, by the processor, an anomaly score associated for the plurality of monitored segmentations; selecting, by the processor, at least one monitored segmentation of the plurality of monitored segmentations based on the anomaly score; determining, by the processor, that a selected monitored segmentation of the plurality of monitored segmentations meets or exceeds a predetermined threshold associated with the anomaly score; and automatically marking, by the processor, the device capable of processing the multi-dimensional data stream with a pre-generated label based on a determination associated with the predetermined threshold.

In some embodiments, the present disclosure provides an exemplary technically improved computer-based system that includes: a non-transient computer memory, storing software instructions; at least one processor of a first computing device associated with a user; where, when the processor executes the software instructions, the first computing device is programmed to: identify at least one device capable of processing a multi-dimensional data stream; dynamically calculate a plurality of hash keys for a plurality of monitored segmentations associated with the at least one device capable of processing the multi-dimensional data stream; generate at least one increment data counter that corresponds to each hash value of the plurality of hash keys in a plurality of counting structures, where the plurality of counting structures comprise a current counting structure and a total counting structure; dynamically calculate an anomaly score associated for the plurality of monitored segmentations; select at least one monitored segmentation of the plurality of monitored segmentations based on the anomaly score; determine that a selected monitored segmentation of the plurality of monitored segmentations meets or exceeds a predetermined threshold associated with the anomaly score; and automatically mark the at least one device capable of processing the multi-dimensional data stream with a pre-generated label based on a determination associated with the predetermined threshold.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 is a flowchart illustrating operational steps for automatically marking a device capable of processing a multi-dimensional data stream with a pre-generated label, in accordance with one or more embodiments of the present disclosure.

FIG. 10 depicts an example of the plurality of feature values associated with each monitored segmentation of the plurality of monitored segmentations, in accordance with one or more embodiments of the present disclosure.

DETAILED DESCRIPTION

Figure 1:
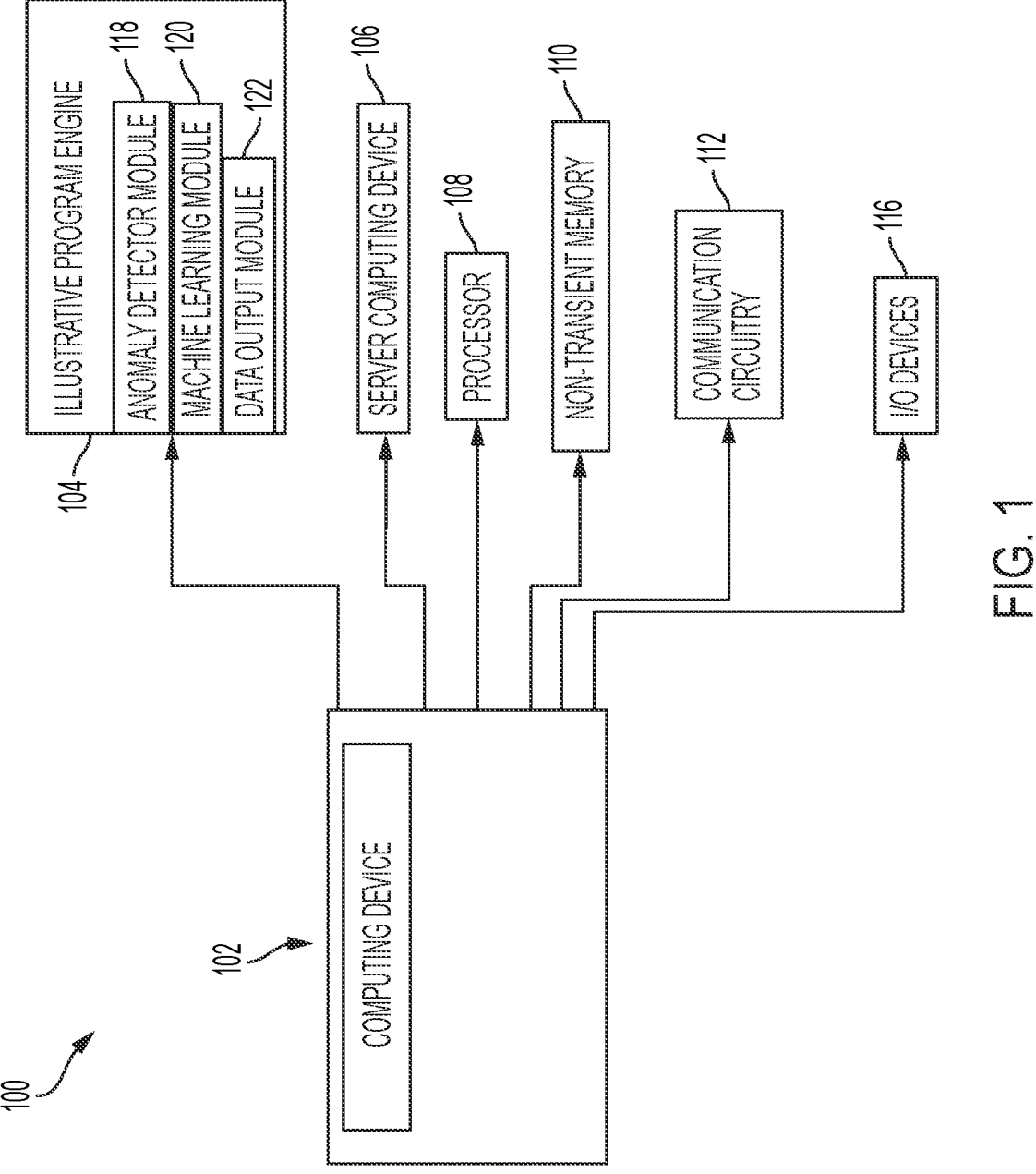
FIG. 1 depicts a block diagram of an exemplary computer-based system and platform for automatically marking a device capable of processing a multi-dimensional data stream with a pre-generated label, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to at least one technological computer-centered problem associated with identity theft attacks coming from booking a large number of fraudulent accounts. This technological computer-centered problem associated with the identity theft attacks lead to additional operational expenses, reputational risks and business disruptions. Typically, the problem arises when an identity theft attack occurs, the attack may be presented as an increase in account opening activity (i.e., account number spike), and when detectable account opening activity associated with an account increases beyond an expected level. This account opening activity is identified as an anomaly that may be detected to determine when the identity theft has reached a particular threshold. As detailed in at least some embodiments herein, at least one technological computer-centered solution addressing the technological computer-centered problem may be to use an anomaly detection system capable of anomaly detection in multi-dimensional data streams in real time. In certain embodiments, a monitored segmentation of the multi-dimensional data stream may refer to a monitored combination of features within the data stream, further referred to as segmentations. In some embodiments, the present disclosure details that one practical solution may be to utilize an anomaly detection system that detects and isolates anomalous activities in multi-dimensional data streams in real time. For example, the system may incorporate an automatic adaptation to changing anomaly patterns by dynamically optimizing the monitored combination of features, further referred to as segmentations. In some embodiments, the present disclosure details a hierarchical procedure for selecting segmentations most sensitive to anomalies for high-cardinality multi-dimensional streams where an exhaustive set of features cannot be tested due to the high number of combinations. In some embodiments, the use of segmentations based on multiple features and feature combinations allows for optimized identification of fraudulent activities even when fraud patterns change. In some embodiments, the present disclosure may maintain two counting data structures for each segmentation to monitor the total number of events for all observed time steps and the number of events within the current time step. Each counting data structure can be based on data sketches to enable processing large numbers of segmentations in constant time and using constant memory. In some embodiments, the present disclosure may use a count-min sketch for counting events within the data segmentation and utilize a chi-squared goodness of fit test to detect anomalous changes in the number of events.

In some embodiments, the present disclosure may identify at least one device capable of processing a multi-dimensional data stream. These multi-dimensional data streams are associated with a microcluster-based detector of anomalies in edge streams. In some embodiments, the present disclosure may dynamically calculate a plurality of hash keys for a plurality of monitored segmentations associated with the device capable of processing the multi-dimensional data stream. The plurality of hash keys may refer to a plurality of features to determine hash keys associated with count estimates and may include individual features and feature combinations. In some embodiments, the present disclosure may generate at least one increment data counter that corresponds to each hash value of the plurality of hash keys in a plurality of counting structures. The plurality of counting structures may refer to a current counting structure and a total counting structure. In some embodiments, the present disclosure may dynamically calculate an anomaly score associated for each monitored segmentation of the plurality of monitored segmentations. The anomaly score includes a chi-squared goodness of fit statistics calculated for the current time period and all past time periods. The anomaly score may refer to a mean anomaly score determined as a sum of anomaly scores of all items within the segmentation divided by the number of items. In some embodiments, the present disclosure may select at least one monitored segmentation of the plurality of monitored segmentations based on the anomaly score. The selection of the monitored segmentation is based on the comparison of representative anomaly scores of all segmentations (i.e., the segmentation with the highest mean anomaly score indicates better identification of anomalous events within the given segmentation). In some embodiments, the present disclosure may determine that a selected monitored segmentation of the plurality of monitored segmentations meets or exceeds a predetermined threshold of risk. The predetermined threshold of risk is directly associated with the calculated anomaly score. In some embodiments, the present disclosure may automatically mark the device capable of processing the multi-dimensional stream with a pre-generated label based on a determination associated with the threshold of risk.

FIG. 1 depicts a block diagram of an exemplary computer-based system and platform for automatically marking a device capable of processing a multi-dimensional data stream with a pre-generated label, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a server computing device 106, a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one communicative computing device of a plurality of communicative computing devices. For example, the computing device 102 is a smart device capable of processing a multi-dimensional data stream.

In some embodiments, the illustrative program engine 104 may be configured to instruct the processor 108 to execute one or more software modules such as, without limitation, an exemplary anomaly detector module 118, a machine learning module 120, and/or a data output module 122.

In some embodiments, an exemplary anomaly detector module 118 of the present disclosure may utilize at least one machine learning module 120, described herein, to automatically mark the computing device 120 with a pre-generated label based on a determination associated with the predetermined threshold. The pre-generated label may refer to a label detailing a segmentation with additional information such as frequency information. In certain embodiments, these pre-generated labels may provide frequency information associated with detected anomalies for segmentations based on at least one input feature, total anomalies detected value, average anomaly score value, or values of anomaly score standard deviation. In certain embodiments, the at least one feature may be required to define a segment. In certain embodiments, the data segmentations may refer to a combination of one or multiple features of the multi-dimensional data stream. These segmentations with multiple features may have a high cardinality based on feature combinatorics. In certain embodiments, data sketches maybe used to handle large inputs, specifically large cardinality of the inputs that remain non-fixed. In some embodiments, the exemplary anomaly detector module 118 may identify the computing device 102 capable of processing the multi-dimensional data stream. In some embodiments, the exemplary anomaly detector module 118 may dynamically calculate a plurality of hash keys for a plurality of monitored segmentations associated with the computing device 102, where each hash key maintains a plurality of hash values. In certain embodiments, the monitored segmentation may refer to a monitored combination of features within the data stream, further referred to as segmentations. In certain embodiments, the hash keys may refer to input that has functions producing a plurality of hash value. The hash keys may be constructed from a plurality of feature values and/or a combination of the plurality of features values when the monitored segmentation contains multiple features. In certain embodiments, the plurality of hash keys may refer to a plurality of features to determine hash values associated with count estimates. In some embodiments, the plurality of hash keys may include a plurality of feature values that further include a plurality of feature combinations. In certain embodiments, the feature combination may include an individual feature These hash keys may be associated with individual features and feature combinations. In some embodiments, the exemplary anomaly detector module 118 may generate at least one increment data counter that corresponds to each hash key of the plurality of hash keys in a plurality of counting structures. For example, a moderate number of features of all possible feature combinations within a monitored segmentation may be generated by a particular combinatorial approach, such as four features result in at least fifteen possible segmentations, where the number of segmentations increases rapidly in comparison to the number of features. In certain embodiments, the plurality of counting structures may include a current counting structure and a total counting structure. In some embodiments, the exemplary anomaly detector module 118 may dynamically calculate an anomaly score associated with each monitored segmentation for the plurality of monitored segmentations. In certain embodiments, the anomaly score may include a chi-squared goodness of fit statistics calculated for a current time period and any past time periods. In certain embodiments, the anomaly score may refer to a mean anomaly score determined as a sum of a plurality of anomaly scores of each feature within the segmentation divided by a number of features associated with the segmentation. In some embodiments, the exemplary anomaly detector module 118 may select at least one monitored segmentation based on a calculated anomaly score. In certain embodiments, the selection of the monitored segmentation may be based on a comparison of representative anomaly scores of all segmentation. For example, the segmentation with the highest mean anomaly score indicates an optimized identification of anomalous events within the given segmentation. In some embodiments, the exemplary anomaly detector module 118 may determine that a selected segmentation meets or exceeds a predetermined threshold associated with the calculated anomaly score. In some embodiments, the exemplary anomaly detector module 118 may construct a first segmentation based on each individual feature and a representative anomaly score; select a particular feature for subsequent segmentation construction based on the representative anomaly score; construct a second segmentation based on a pairwise feature combination and a different anomaly score associated with the pairwise feature combination; and perform an exhaustive combinatorial search for a hierarchical approach based on selected features. In certain embodiments, the selected features associated with the hierarchical approach may refer to a top-k segmentation, where the "k" is selected based on the available processing resources and system latency requirements.

In some embodiments, the present disclosure describes systems for utilizing the machine learning module 120 that may dynamically calculate the plurality of hash keys for the plurality of monitored segmentations associated with the computing device 102. In some embodiments, the machine learning module 120 may generate at least one increment data counter that corresponds to each hash value of the plurality of hash keys in the plurality of counting structures. In some embodiments, the machine learning module 120 may dynamically calculate the anomaly score associated with the plurality of monitored segmentations. In some embodiments, the machine learning module 120 may select at least one monitored segmentation of the plurality of monitored segmentations based on the anomaly score. In some embodiments, the machine learning module 120 may automatically mark the computing device 102 with the pre-generated label based on the determination associated with the predetermined threshold. In some embodiments, the machine learning module 120 may construct a first segmentation based on each individual feature and a representative anomaly score; select a particular feature for subsequent segmentation construction based on the representative anomaly score; construct a second segmentation based on a pairwise feature combination and a different anomaly score associated with the pairwise feature combination; and perform an exhaustive combinatorial search for a hierarchical approach based on selected features.

In some embodiments, the data output module 122 may output an identification of the computing device 102 capable of the multi-dimensional data stream. In some embodiments, the data output module 122 may output the plurality of hash keys for the plurality of monitored segmentations associated with the computing device 102. In some embodiments, the data output module 122 may output at least one data counter that corresponds to each hash value of the plurality of hash keys within the plurality of counting structures. In some embodiments, the data output module 122 may output a calculated anomaly score associated for each monitored segmentation of the plurality of segmentations. In some embodiments, the data output module 122 may output a selection of at least one monitored segmentation based on a comparison of representative anomaly scores of the plurality of monitored segmentations. In some embodiments, the data output module 122 may output a determination of whether the selected monitored segmentation meets or exceeds a predetermined threshold of risk associated with the anomaly score. In some embodiments, the data output module 122 may output a plurality of pre-generated labels to automatically mark the computing device 102 based on the determination associated with the predetermined threshold.

In some embodiments, the illustrative program engine 104 may identify at least one device capable of a multi-dimensional data stream. In some embodiments, the illustrative program engine 104 may dynamically calculate a plurality of hash keys for a plurality of monitored segmentations associated with at least one device capable of processing the multi-dimensional data streams. In some embodiments, the illustrative program engine 104 may generate at least one increment data counter that corresponds to each hash value of the plurality of hash keys in a plurality of counting segmentations. In certain embodiments, the plurality of counting structures include a current counting structure and a total counting structure. In some embodiments, the illustrative program engine 104 may dynamically calculate an anomaly score associated for each monitored segmentation of the plurality of monitored segmentations. In certain embodiments, the anomaly score comprise mean anomaly scored based on a chi-squared goodness of fit statistics calculated for the current time period and any previous time periods, where the calculation is the sum of anomaly scores for each segmentation divided by the total number of segmentations within the plurality of monitored segmentations. In some embodiments, the illustrative program engine 104 may select at least one monitored segmentation of the plurality of monitored segmentations based on a comparison of representative anomaly scores. In some embodiments, the illustrative program engine 104 may determine that a selected monitored segmentation meets or exceeds a predetermined threshold of risk associated with the anomaly score. In some embodiments, the illustrative program engine 104 may automatically mark the computing device 102 with a plurality of pre-generated labels based on a determination associated with the predetermined threshold of risk.

In some embodiments, the non-transient computer memory 110 may store the identification of the computing device 102 capable of the multi-dimensional data stream. In some embodiments, the non-transient computer memory 110 may store the plurality of hash keys for the plurality of monitored segmentation associated with the computing device 102. In some embodiments, the non-transient computer memory 110 may store at least one data counter that corresponds to each hash value of the plurality of hash keys within the plurality of counting structures. In some embodiments, the non-transient computer memory 110 may store the calculated anomaly score associated for each monitored segmentation of the plurality of segmentations. In some embodiments, the non-transient computer memory 110 may store the selection of at least one monitored segmentation based on a comparison of representative anomaly scores of the plurality of monitored segmentations. In some embodiments, the non-transient computer memory 110 may store a plurality of pre-generated labels to automatically mark the computing device 102 based on the determination associated with the predetermined threshold.

FIG. 2 is a flowchart 200 illustrating operational steps for automatically marking a device capable of a processing multi-dimensional data stream with a pre-generated label, in accordance with one or more embodiments of the present disclosure.

In step 202, the illustrative program engine 104 within the computing device 102 may identify at least one device capable of processing a multi-dimensional data stream. In some embodiments, the illustrative program engine 104 the illustrative program engine 104 may identify the computing device 102 capable of the multi-dimensional data stream. In certain embodiments, the multi-dimensional data stream may refer to a microcluster-based detector of anomalies in edge streams. In some embodiments, the illustrative program engine 104 may identify a multi-dimensional data item within the multi-dimensional data stream. In some embodiments, each multi-dimensional data item contains a plurality of values for segmentations of interests using features associated with the multi-dimensional data item. In certain embodiments, the features associated with the multi-dimensional data item may refer to an individual feature and feature combinations. In certain embodiments, the illustrative program engine 104 may identify the computing device 102 capable of the multi-dimensional data stream by monitoring the plurality of segmentations associated with the multi-dimensional data item. In certain embodiments, the monitored segmentation may refer to a monitored combination of features within the data stream, further referred to as segmentations. In some embodiments, the exemplary anomaly detector module 118 may identify the computing device 102 capable of the multi-dimensional data stream.

In step 204, the illustrative program engine 104 may calculate a plurality of hash keys for a plurality of monitored segmentations. In some embodiments, the illustrative program engine 104 may dynamically calculate the plurality of hash keys for the plurality of monitored segmentations associated with the computing device 102 capable of the multi-dimensional data stream. In certain embodiments, the plurality of hash keys may refer to a plurality of features to determine hash keys associated with count estimates, where each feature of the plurality of features include a feature value associated with a particular hash key value. Each hash value may refer to a derived segmentation value used by a hash function to determine the hash keys for each monitored segmentation. In some embodiments, the hash function may be utilized depending on a type of utilized counting data structures. For example, a count-min sketch may utilize more than a single hash function for each sketch to improve accuracy of the count estimates. In certain embodiments, the exemplary anomaly detector module 118 may dynamically calculate the plurality of hash keys for the plurality of monitored segmentations associated with the computing device 102.

In step 206, the illustrative program engine 104 may generate an increment data counter. In some embodiments, the illustrative program engine 104 may generate the increment data counter that corresponds to each hash value of the plurality of hash keys within a plurality of counting structures. In certain embodiments, the plurality of counting structures may refer to a current counting structure and a total counting structure associated with the plurality of monitored segmentations. Each counting structure may refer to a calculated hash key, which each counter is incremented. In some embodiments, two count-min sketches are maintained for each monitored segmentation of the plurality of monitored segmentations. A first count-min sketch monitors all items within a particular segmentation that are received over any previous observation time period, and a second count sketch monitors items within the particular segmentation that arrive during the current time period. For example, the illustrative program 104 may utilize a count-min sketch for all items associated for a particular segmentation observed over the previous days and a separate count-min sketch for the items associated with the particular segmentation received today. Other counting structures, such as count sketch, can also be used.

In step 208, the illustrative program engine 104 may calculate an anomaly score associated for each monitored segmentation. In some embodiments, program engine 104 may dynamically calculate the anomaly score associated with each monitored segmentation of the plurality of monitored segmentations. In certain embodiments, the anomaly score comprises a chi-squared goodness of fit statistics calculated for the current time period. The chi-squared goodness of fit statistics may refer to results to a chi-squared goodness of fit test, wherein the test is used to determine whether a variable is likely to come from a specified distribution or whether sample data that is representative of a full population. For example, the anomaly score may refer to a noticeable outlier within the chi-squared goodness of fit statistics based on scores associated for each monitored segmentation of data within the multi-dimensional data stream. In some embodiments, the illustrative program engine 104 may calculate the anomaly score of the particular segmentation by determining a mean anomaly score based on a sum of anomaly scores of all segmentations within the multi-dimensional data stream divided by the number of the segmentations.

In step 210, the illustrative program engine 104 may select a monitored segmentation of the plurality of monitored segmentation. In some embodiments, the illustrative program engine 104 may select the particular segmentation of the plurality of monitored segmentations based on the calculated anomaly score. In certain embodiments, the selection of the particular segmentation may refer to a comparison of representative anomaly scores for the plurality of monitored segmentations. For example, the particular segmentation with the highest mean anomaly score is selected based on an assumption that higher mean anomaly scores indicate better identification of anomalous events within a given segmentation. In some embodiments, the exemplary anomaly detector module 118 may select the particular segmentation of the plurality of monitored segmentations based on the calculated anomaly score.

In step 212, the illustrative program engine 104 may determine that a selected segmentation meets a predetermined threshold. In some embodiments, the illustrative program engine 104 may determine that the selected segmentation meets or exceeds the predetermined threshold of risk associated with the anomaly score. In some embodiments, the predetermined threshold of risk may refer to a predetermined level of risk associated with the data stream and each monitored segmentation that would not be identifiable as an anomaly. In certain embodiments, the program engine 104 may determine that the selected segmentation meets or exceeds the predetermined threshold of risk associated with the anomaly score may refer to when the current stream item is compared to a known threshold to determine whether the item is anomalous or not. In some embodiments, the exemplary anomaly detector module 118 may determine that the selected segmentation meets or exceeds the predetermined threshold of risk associated with the anomaly score. In some embodiments, the illustrative program engine 104 may simultaneously detect a plurality of anomalies in the plurality of monitored segmentations by simultaneously analyzing the plurality of monitored segmentations, determining that an anomaly is identified in a predetermined number of segmentations, where the determination of the identified anomaly in the predetermined number of segmentations exceed the predetermined threshold of risk.

In step 214, the illustrative program engine 104 may automatically mark the computing device 102 with a pre-generated label. In some embodiments, the illustrative program engine 104 may automatically mark the computing device 102 capable of the multi-dimensional data stream with the pre-generated label based on a determination associated with the anomaly score. In certain embodiments, the pre-generated labels may refer to an identification vector associated with the segmentation. For example, the pre-generated labels may include region, internet service provider, domain, and any combination of the three labels. In some embodiments, the pre-generated labels may refer to frequencies and hit rates associated with calculated anomaly scores of each monitored segmentation. In some embodiments, the exemplary anomaly detector module 118 may automatically mark the computing device 102 capable of the multi-dimensional data stream with the pre-generated label based on the determination associated with the anomaly score.

In some embodiments, the illustrative program engine 104 may enable real-time processing of anomaly detection for high-dimensionality streams by employing parallel processing of the calculation of anomaly scores for each segmentation of the plurality of monitored segmentations. In certain embodiments, the parallelization occurs by separating processing routes for different segmentations within the plurality of monitored segmentations and can be performed by utilizing a plurality of computer processing units or a graphical user interface. In some embodiments, the illustrative program engine 104 may dynamically calculate the anomaly score and automatically mark the computing device 102 with the pre-generated labels associated with the calculated anomaly score based on a batch model for when a plurality of anomalous events are detected over a fixed period of time. In some embodiments, the illustrative program engine 104 may construct a first segmentation based on each individual feature and a representative anomaly score; select a particular feature for subsequent segmentation construction based on the representative anomaly score; construct a second segmentation based on a pairwise feature combination and a different anomaly score associated with the pairwise feature combination; and perform an exhaustive combinatorial search for a hierarchical approach based on selected features. In certain embodiments, the selected features associated with the hierarchical approach may refer to a top-k segmentation, where the "k" is selected based on the available processing resources and system latency requirements. In certain embodiments, the illustrative program engine 104 may utilize the machine learning module 120 to predict modifications in the calculated anomaly score associated with the selected segmentation based on receiving additional information. In some embodiments, the illustrative program engine 104 may utilize the graphical user interface to display the pre-generated label associated with the marking of the computing device 102.

Figure 3A:
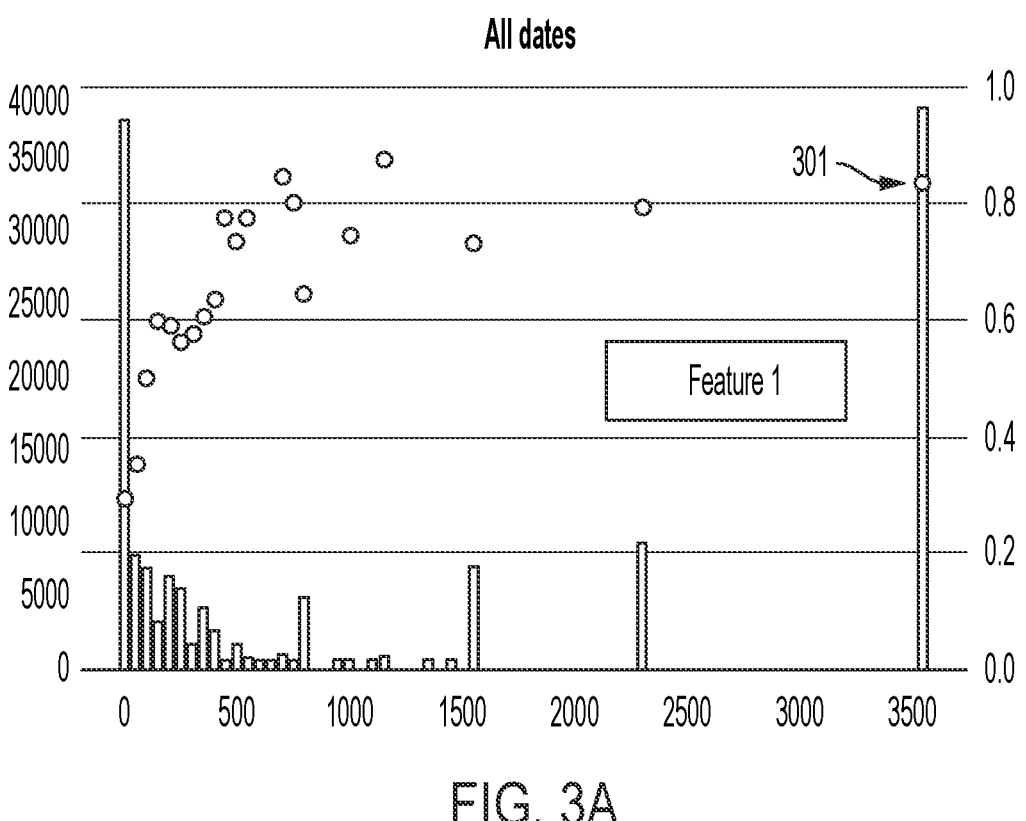
FIGS. 3A-3G depicts exemplary results of each particular segmentation of the plurality of monitored segmentations, in accordance with one or more embodiments of the present disclosure.
Figure 3B:
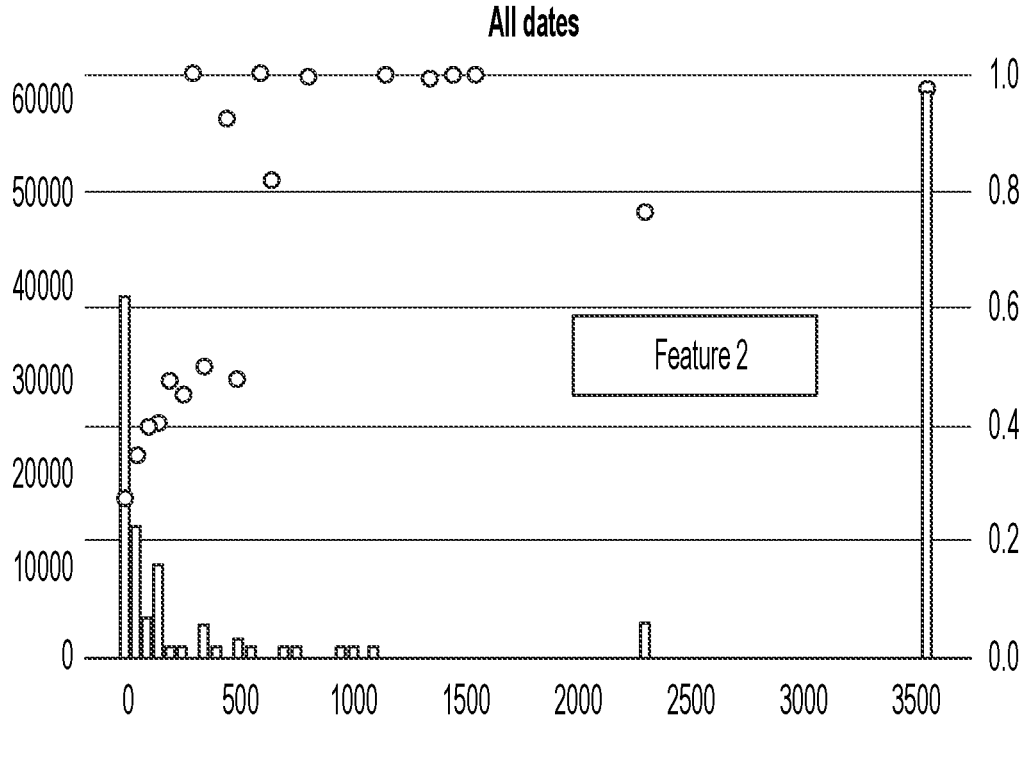
Figure 3C:
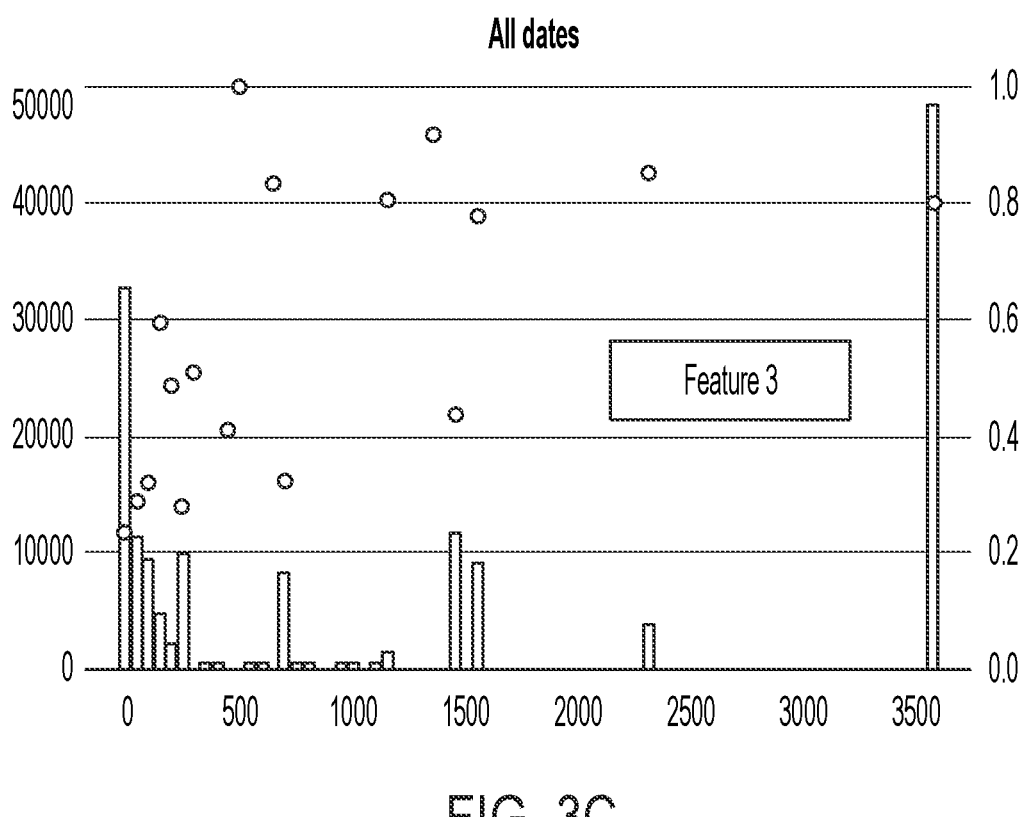
Figure 3D:
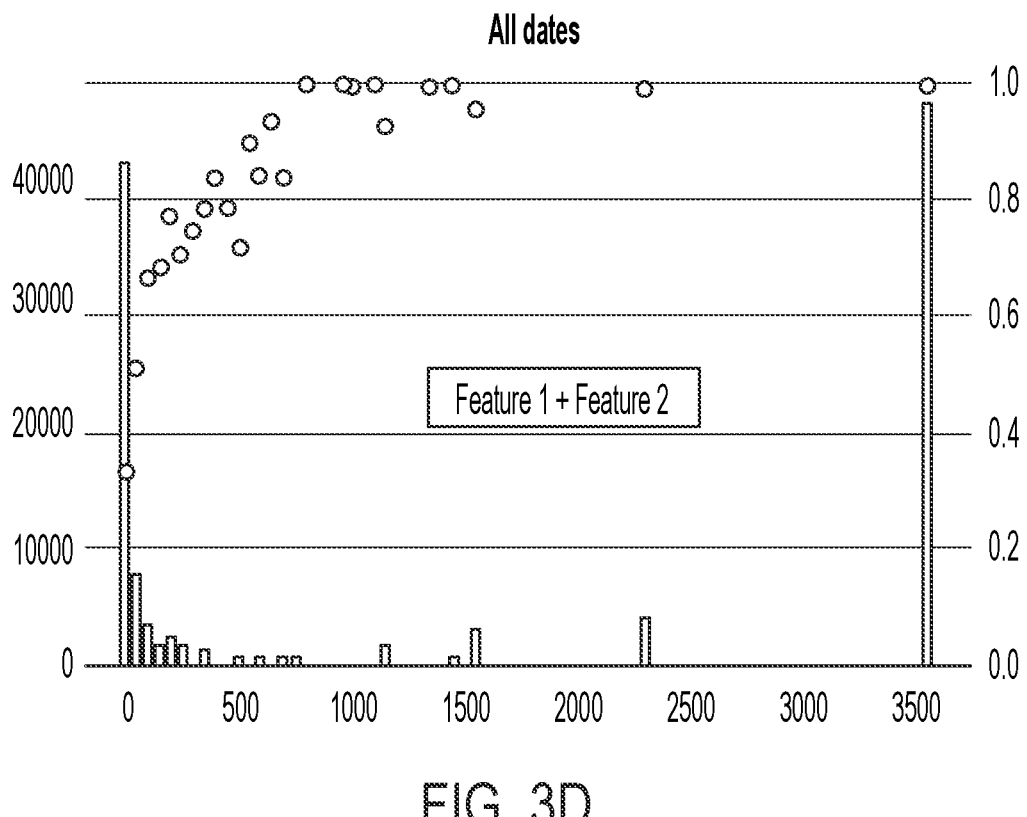
Figure 3E:
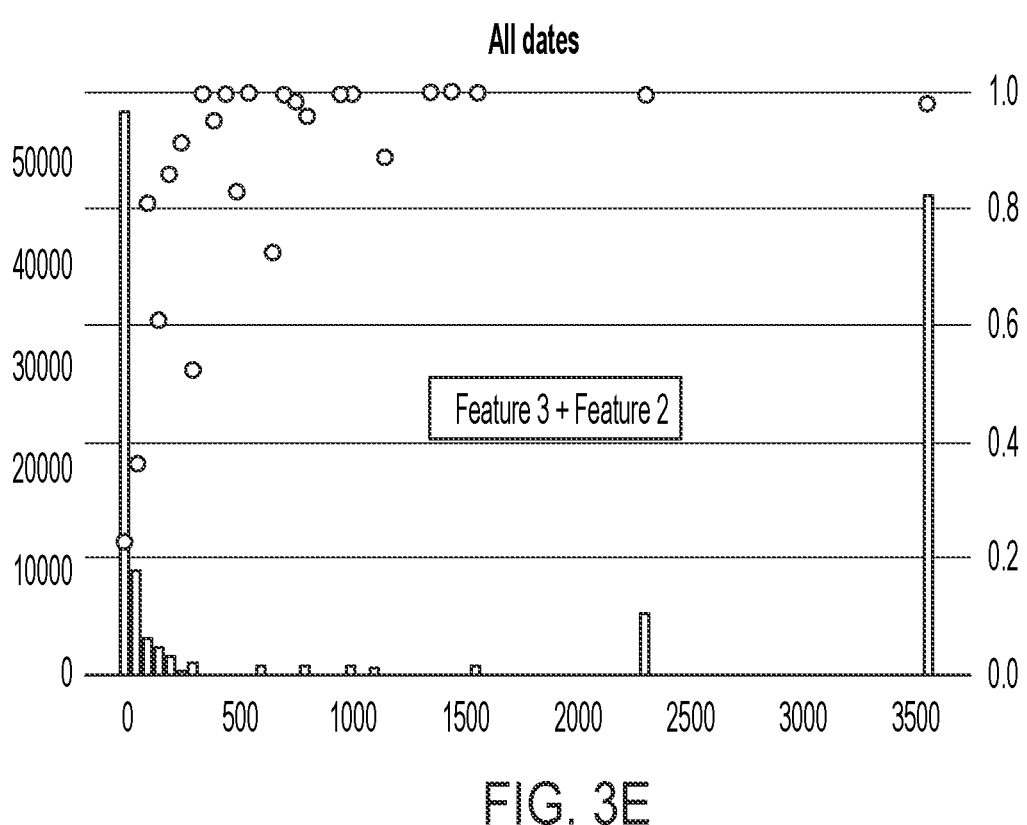
Figure 3F:
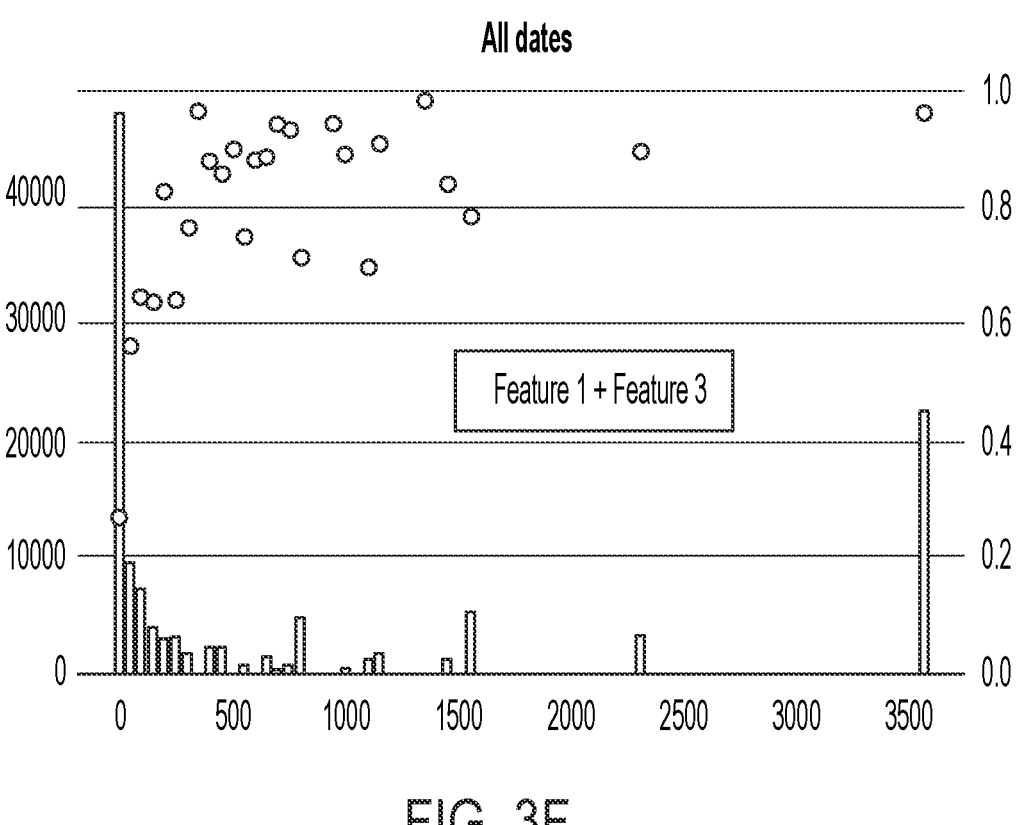
Figure 3G:
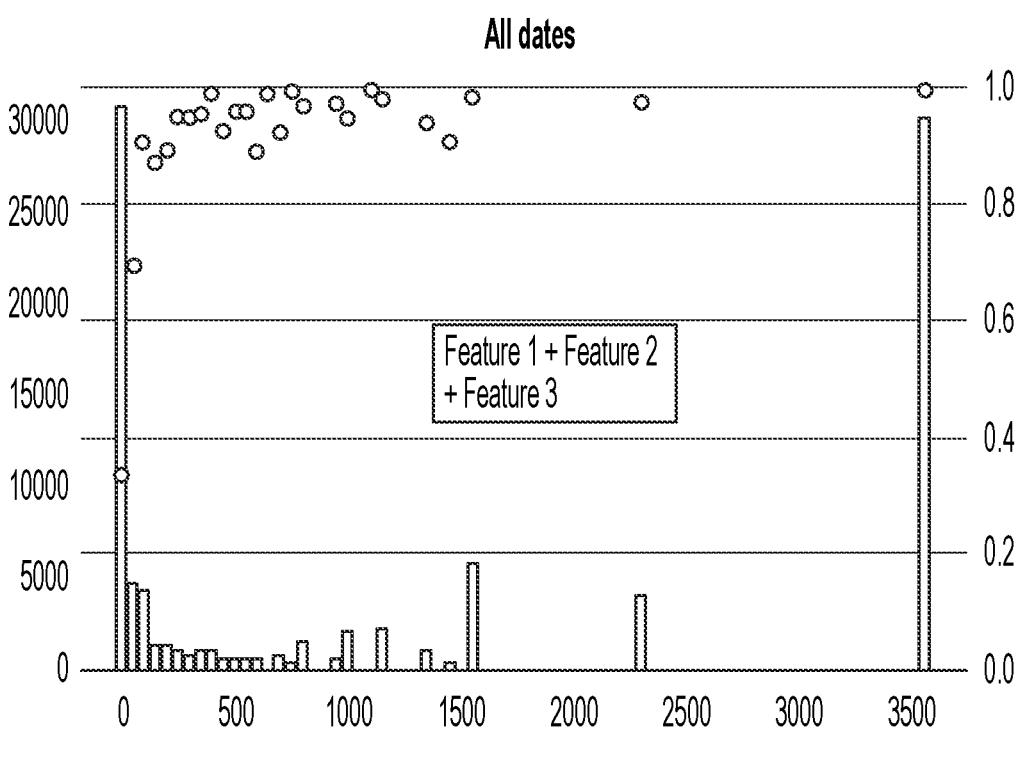

FIGS. 3A-3G depict exemplary results of the particular segmentations of the plurality of monitored segmentations, in accordance with one or more embodiments. FIG. 3A depicts a result of the anomaly detection using chi-squared goodness of fit test associated with a particular segmentation of the plurality of features. For example, FIG. 3A may depict a result of anomaly detection using feature 1 of the plurality of features. FIG. 3B depicts a result of the anomaly detection using a chi-squared goodness of fit test associated with the particular segmentation with a particular feature of a plurality of features. For example, FIG. 3B depicts a result of anomaly detection using feature 2 of the plurality of features. FIG. 3C depicts a result of the anomaly detection using a chi-squared goodness of fit test associated with another particular feature of the plurality of features. For example, FIG. 3C depicts a result of anomaly detection using feature 3 of the plurality of features. FIG. 3D depicts a result of the anomaly detection using a chi-squared goodness fit associated with at least two particular features of the plurality of features. For example, FIG. 3D may depict a result of anomaly detection using a combination of feature 1 and feature 2 of the plurality of features to generate a result of feature 4. The exemplary anomaly detector module 118 may dynamically calculate an anomaly score based on the combination of feature 1 and feature 2 values. FIG. 3E depicts a result of the anomaly detection using chi-squared goodness fit associated with another two particular features of the plurality of features. For example, FIG. 3E may depict a result of anomaly detection using a combination of feature 2 and feature 3 of the plurality of features to generate a result of feature 5. The exemplary anomaly detector module 118 may dynamically calculate an anomaly score based on the anomaly score associated with the combination of feature 2 and feature 3 values. FIG. 3F depicts a result of the chi-squared goodness fit test associated with another two particular features of the plurality of features. For example, FIG. 3F may depict a result of an anomaly detection using a combination of feature 1 and feature 3 of the plurality of features to generate a result of feature 6. The exemplary anomaly detector module 118 may dynamically calculate an anomaly score based on the combination of feature 1 and feature 3 values. FIG. 3G depicts a result of the anomaly detection using a chi-squared goodness fit test associated with the particular segmentation with a at least three particular features of the plurality of features. For example, FIG. 3G may depict a result of an anomaly detection using a combination of feature 1, feature 2, and feature 3 of the plurality of features to generate a result of feature 7. The exemplary anomaly detector module 118 may dynamically calculate an anomaly score based on a combination of feature 1, feature 2, and feature 3 values. In some embodiments, each result of the chi-squared goodness of fit test identifies anomalies within each segmentation using a predefined chi-squared threshold.

Figure 4:
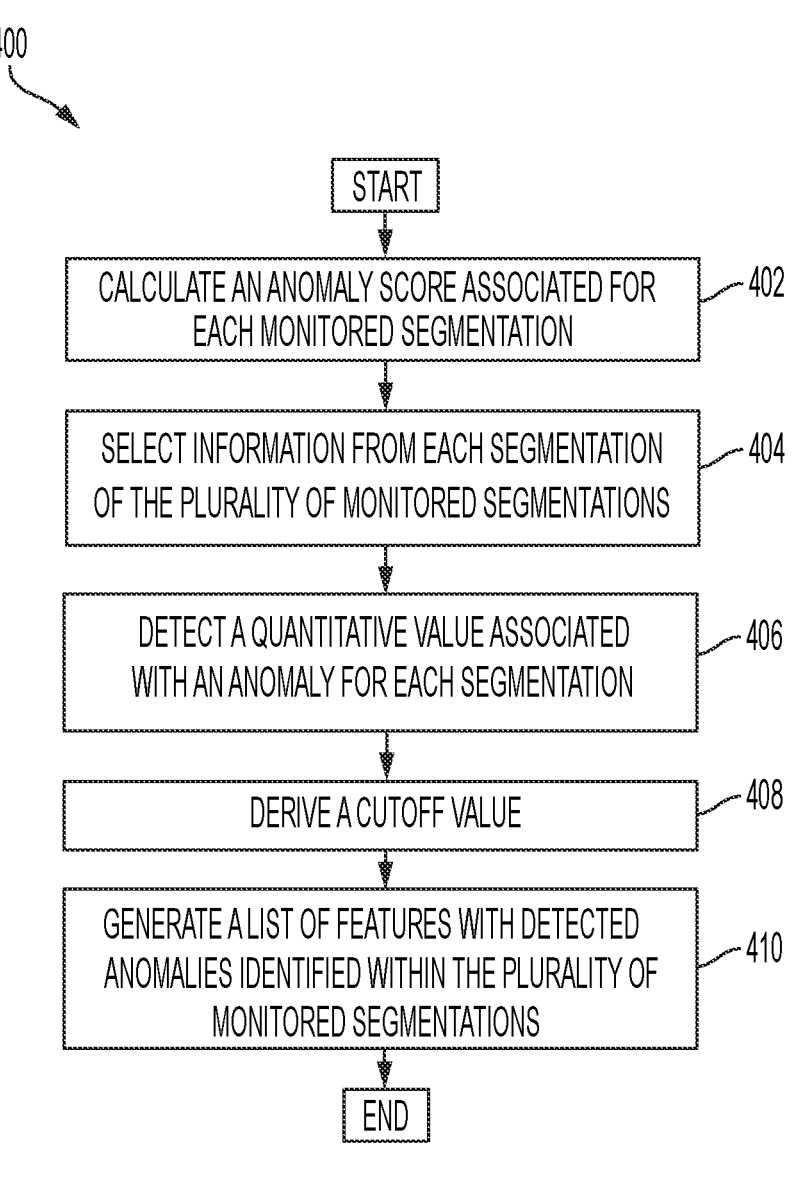
FIG. 4 depicts a flowchart illustrating operational steps for detecting anomalies based on a simultaneous monitoring of multiple segmentations of the multi-dimensional data stream, in accordance with one or more embodiments of the present disclosure.

FIG. 4 depicts a flowchart 400 illustrating operational steps for detecting anomalies based on a simultaneous monitoring of the multi-dimensional data stream, in accordance with at least one embodiment of the present disclosure.

In step 402, the illustrative program engine 104 may calculate an anomaly score associated for each monitored segmentation. In some embodiments, the program engine 104 may dynamically calculate the anomaly score associated with each monitored segmentation of the plurality of monitored segmentations. In certain embodiments, the anomaly score comprises a chi-squared goodness of fit statistics calculated for the current time period. The chi-squared goodness of fit statistics may refer to results to a chi-squared goodness of fit test, wherein the test is used to determine whether a variable is likely to come from a specified distribution or whether sample data that is representative of a full population. For example, the anomaly score may refer to a noticeable outlier within the chi-squared goodness of fit statistics based on scores associated for each monitored segmentation of data within the multi-dimensional data stream. In some embodiments, the illustrative program engine 104 may calculate the anomaly score of the particular segmentation by determining a mean anomaly score based on a sum of anomaly scores of all detected anomalies within the particular segmentation divided by the number of detected anomalies.

In step 404, the illustrative program engine 104 may select information from each segmentation of the plurality of monitored segmentation. In some embodiments, the illustrative program engine 104 may select a plurality of features associated with each segmentation of the plurality of monitored segmentations. In certain embodiments, the illustrative program engine may simultaneously select information from each feature of the plurality of features, where the plurality of features may be associated with the plurality of monitored segmentations.

In step 406, the illustrative program engine 104 may detect a quantitative value associated with an anomaly for each segmentation. In some embodiments, the illustrative program engine 104 may dynamically detect a value associated with how numerous a detected anomaly occurs in the plurality of monitored segmentations. For example, a high confidence value of the anomalousness may refer to the more segmentations the detected anomaly is identified with. Also, a low confidence value may refer to a fewer amount of segmentation the detected anomaly is identified with.

In step 408, the illustrative program engine 104 may derive a cutoff value. In some embodiments, the illustrative program engine 104 may derive cutoff value based on the quantitative value associated with the detected anomaly of each monitored segmentation. In some embodiments, the cutoff value may refer to a threshold value associated with a detected anomaly for the simultaneous selection of the plurality of monitored segmentations. For example, for a multi-dimensional data stream containing three features and at least six segmentations, the cutoff value of a detected anomaly may be 3, a detected anomaly for each feature associated with each monitored segmentation. In some embodiments, the derivation of the cutoff value may refer to an optimum cutoff value based on the number of monitored segmentations within the plurality of monitored segmentations.

In step 410, the illustrative program engine 104 may generate a list of features with detected anomalies identified within the plurality of monitored segmentations. In some embodiments, the illustrative program engine 104 may simultaneously generate a plurality of labels associated with the particular features of the selected monitored segmentations based on the derivate cutoff values associated with the detected anomalies within the plurality of monitored segmentations. In some embodiments, the illustrative program engine 104 may generate the plurality of labels in response to the cutoff value based on the detected anomalies is greater than and/or equal to the number of monitored segmentations of the plurality of monitored segmentations. In certain embodiments, the labels may refer to a feature maximum value and a total anomalies detected value, where each are considered separate features associated for each monitored segmentation of the plurality of monitored segmentations.

Figure 5:
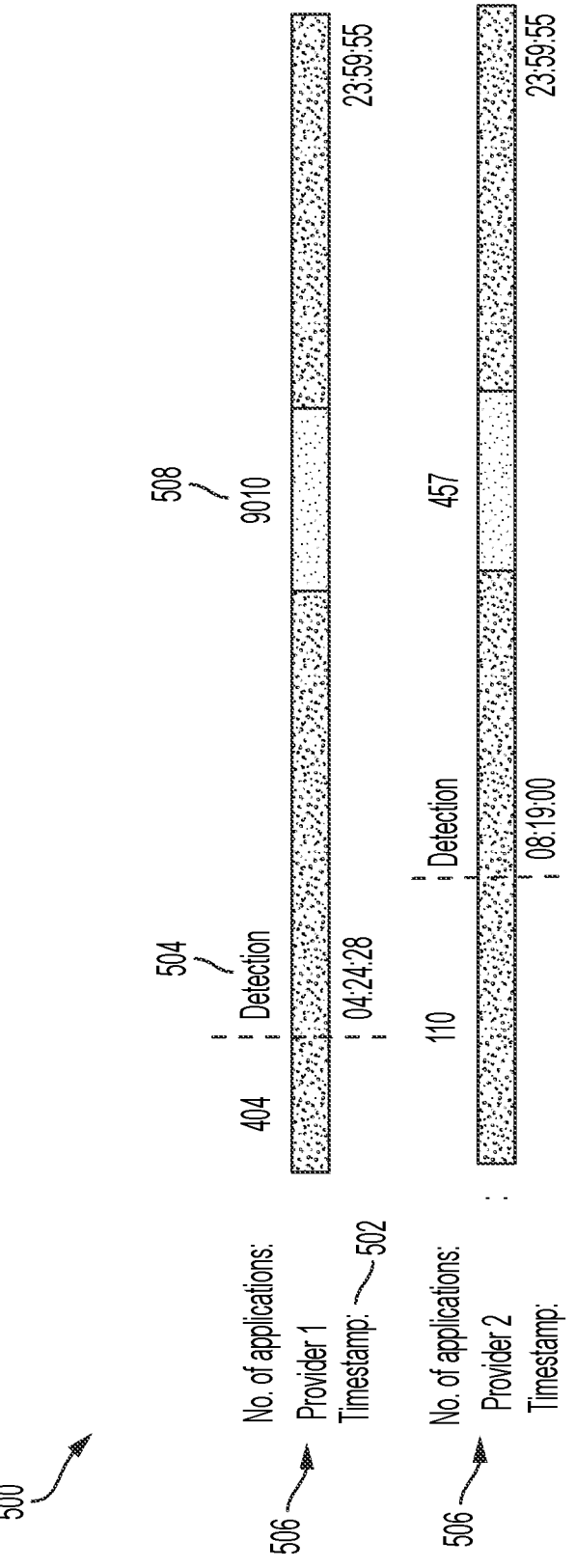
FIG. 5 depicts an example of a real-time detection of an anomaly for a particular segmentation of the plurality of monitored segmentations, in accordance with one or more embodiments of the present disclosure.

FIG. 5 depicts an example of a real-time detection 500 of an anomaly for a particular segmentation, in accordance with at least one embodiment of the present disclosure. In FIG. 5, there is a timestamp 502 that provides the monitored time associated with the segmentation, a detection point 504 associated with the anomaly occurs within the timestamp 502, an identifier label 506 associated with the specific value within particular segmentation, a total number of anomalies 508 detected for the specific value within monitored segmentation and a hit rate 510 associated with the anomaly detection score associated with each particular monitored segmentation value.

Figure 6:
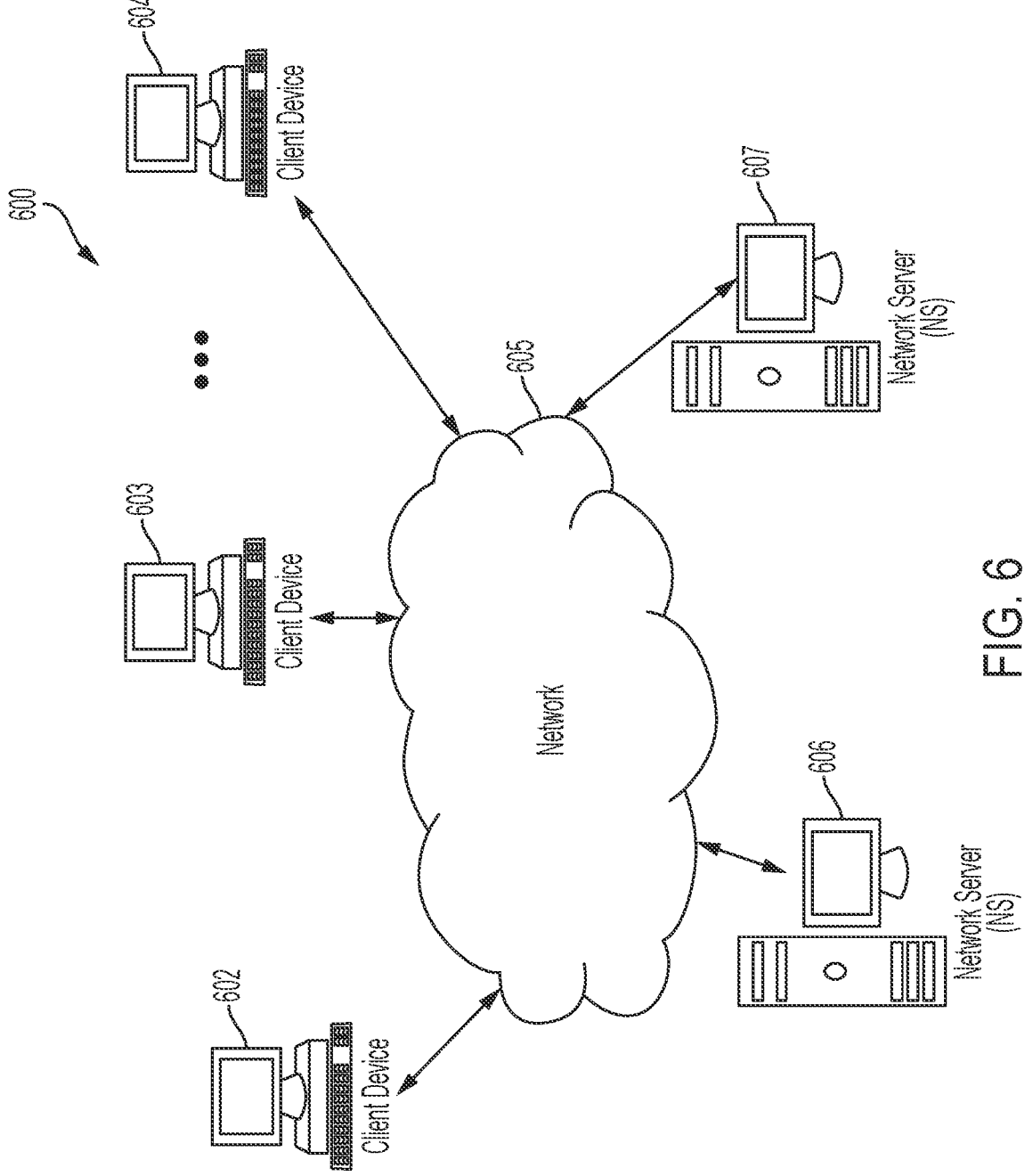
FIG. 6 depicts a block diagram of an exemplary computer-based system/platform in accordance with one or more embodiments of the present disclosure.

FIG. 6 depicts a block diagram of an exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 600 may be configured to automatically mark the computing device 102 with a pre-generated label based on a determination associated with the predetermined threshold, as detailed herein. In some embodiments, the exemplary computer-based system/platform 600 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 600 may be configured to manage the exemplary anomaly detection module 118 of the present disclosure, utilizing at least one machine-learning model described herein.

In some embodiments, referring to FIG. 6, members 602-604 (e.g., clients) of the exemplary computer-based system/platform 600 may include virtually any computing device capable of automatically authenticating an action associated with the computing device 102 based on a data beacon of a plurality of data beacons generating a primed signal via a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 602-604 may include may launch one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary anomaly detection module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine-readable media.

In some embodiments, the exemplary server 606 or the exemplary server 607 may be a web server (or a series of servers) running a network operating system, examples of which may include but are not limited to Microsoft Windows Server, Novell NetWare, or Linux. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to dynamically calculate the anomaly score associated with each monitored segmentation of the plurality of monitored segmentations; select the particular segmentation of the plurality of monitored segmentations based on the calculated anomaly score; and automatically mark the computing device 102 with a pre-generated label based on a determination associated with the predetermined threshold.

Figure 7:
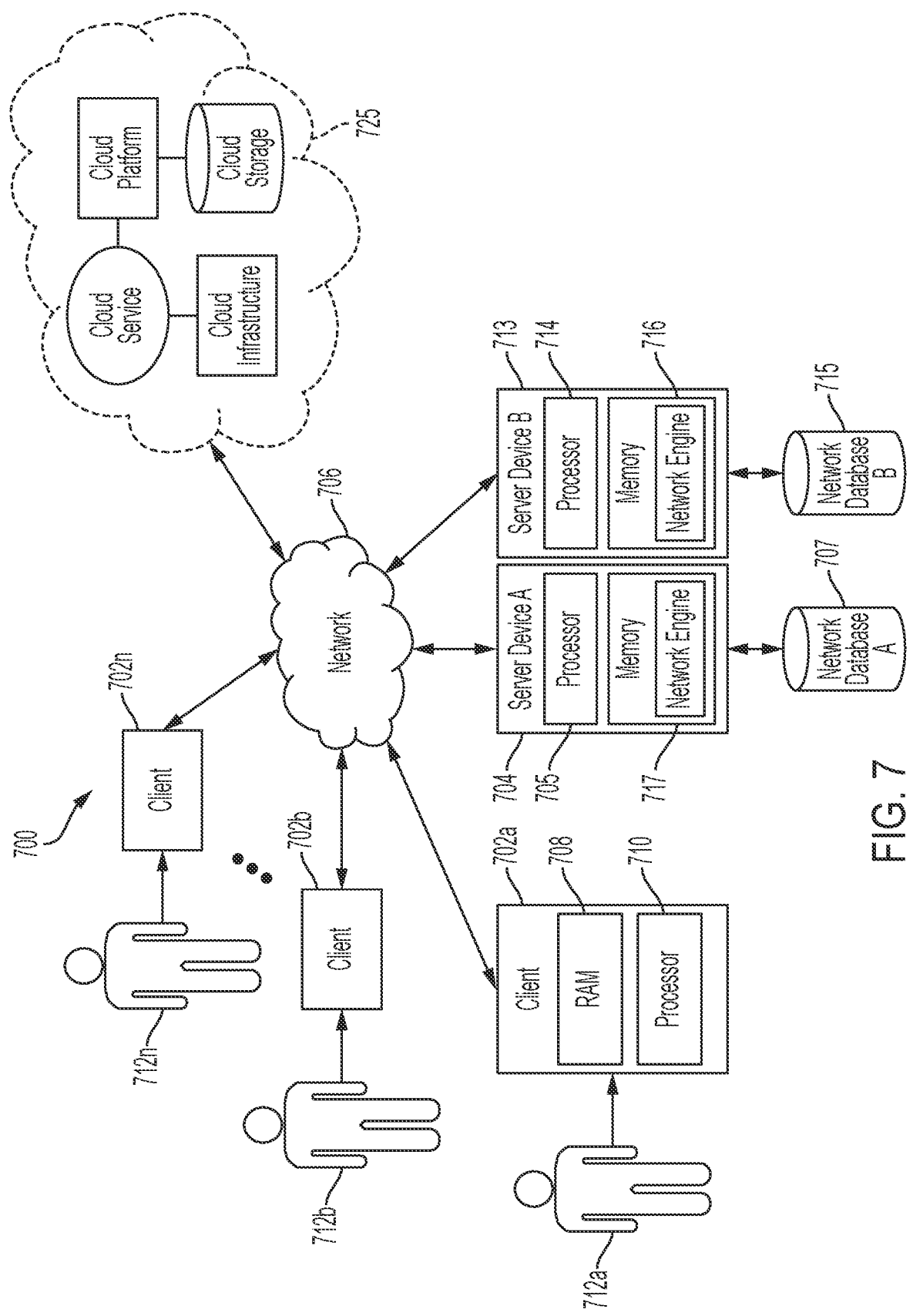
FIG. 7 depicts a block diagram of another exemplary computer-based system/platform in accordance with one or more embodiments of the present disclosure.

FIG. 7 depicts a block diagram of another exemplary computer-based system/platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

Figure 8:
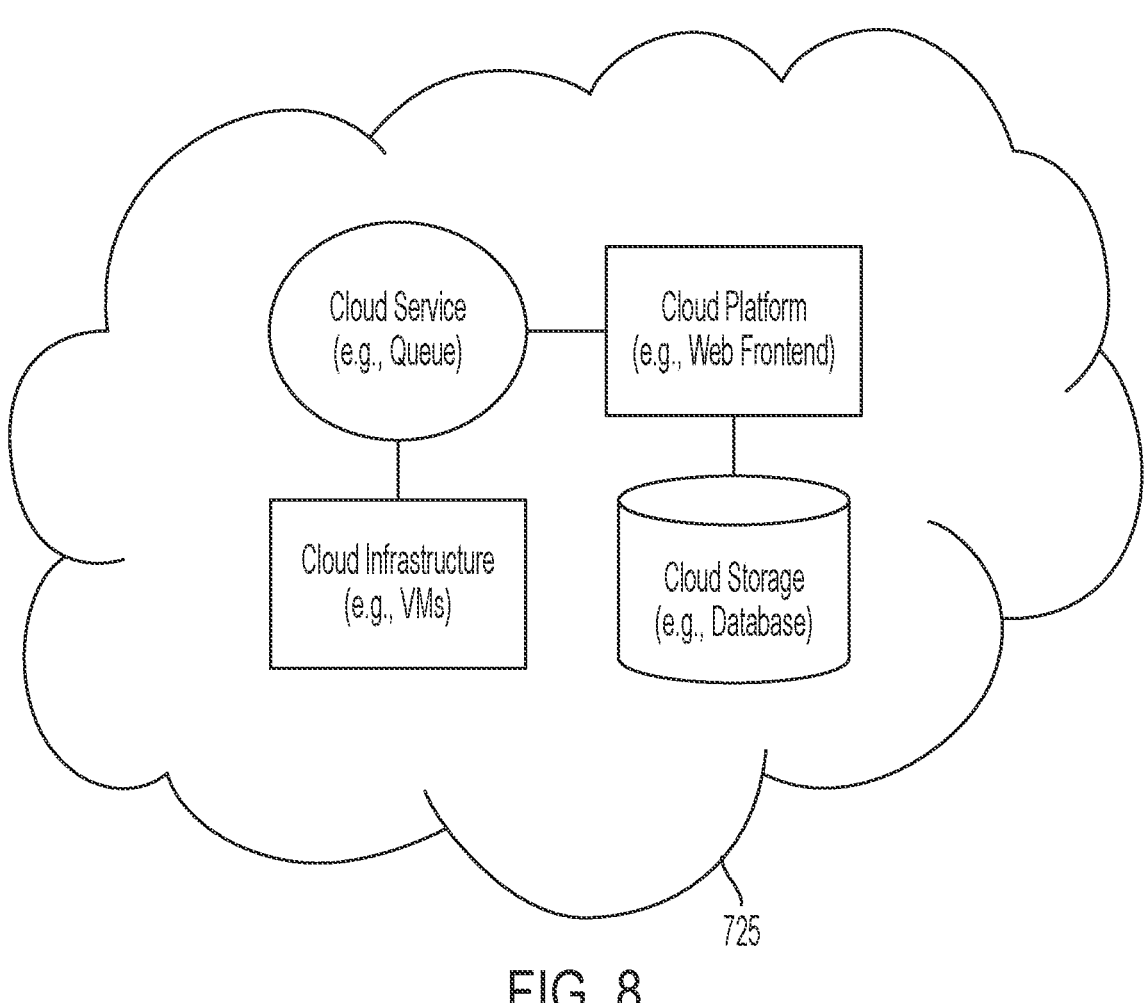
FIGS. 8 and 9 are diagrams illustrating implementations of cloud computing architecture/aspects with respect to which the disclosed technology may be specifically configured to operate, in accordance with one or more embodiments of the present disclosure.

In some embodiments, member computing devices 702a through 702n may also comprise a number of external or internal devices such as a mouse, a CD-ROM, DVD, a physical or virtual keyboard, a display, a speaker, or other input or output devices. In some embodiments, examples of member computing devices 702a through 702n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™, Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, users, 712a through 712n, may communicate over the exemplary network 706 with each other and/or with other systems and/or devices coupled to the network 706. As shown in FIG. 7, exemplary server devices 704 and 713 may be also coupled to the network 706. Exemplary server device 704 may include a processor 705 coupled to a memory that stores a network engine 717. Exemplary server device 713 may include a processor 714 coupled to a memory 716 that stores a network engine. In some embodiments, one or more member computing devices 702a through 702n may be mobile clients. As shown in FIG. 8, the network 706 may be coupled to a cloud computing/architecture(s) 725. The cloud computing/architecture(s) 725 may include a cloud service coupled to a cloud infrastructure and a cloud platform, where the cloud platform may be coupled to a cloud storage.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
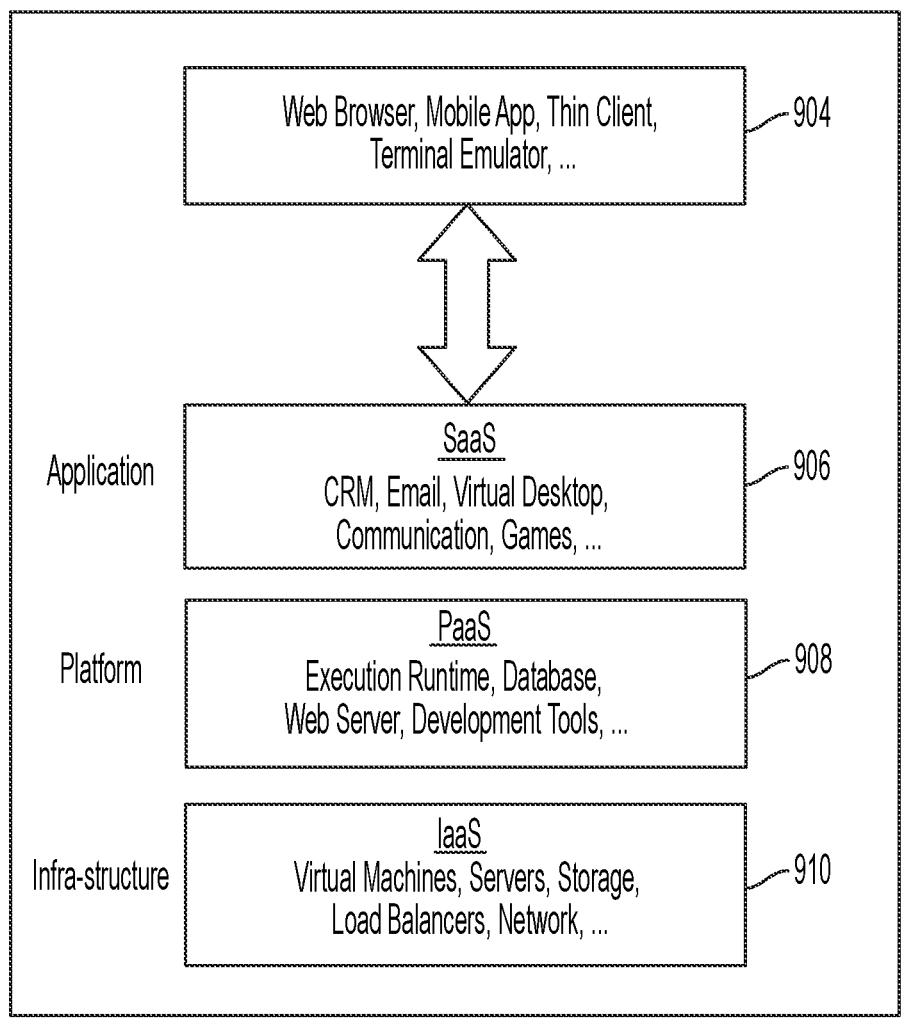

FIG. 8 and FIG. 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 8 illustrates an expanded view of the cloud computing/architecture(s) 725 found in FIG. 7. FIG. 9. illustrates the exemplary inventive computer-based components of the present disclosure may be specifically configured to operate in the cloud computing/architecture 725 as a source database 904, where the source database 904 may be a web browser, a mobile application, a thin client, and a terminal emulator. In FIG. 9, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 910, platform as a service (PaaS) 908, and/or software as a service (SaaS) 906.

FIG. 10 depicts an example 1000 of the plurality of feature values associated with each monitored segmentation of the plurality of monitored segmentations, in accordance with one or more embodiments of the present disclosure.

In FIG. 10, each feature 1, 2, and 3 of the plurality of features are shown with a varying value for each segmentation. In this example 1000, each monitored segmentation may be referred to as an segmentation, such as segmentation 1, segmentation 2, segmentation 3, and so on. The plurality of features associated with the plurality of monitored segmentation provide a unique sequencing of values associate with each feature, as the more complex the combination of features are the higher the cardinality of a plurality of feature values associated with that particular combination. For example, the feature value for feature 1001 may be feature value 1, but the feature value for the combination of feature 1, feature 2 and feature 3 may refer to an aggregation for feature value 1, feature value 2, feature value 4, feature value 1, feature value 2, feature value 5, feature value 1, feature value 3, and feature value 4 together.

TABLE 1

| Segmentation | Anomaly Score |
|---|---|
| ['c1'] | 48.14 |
| ['c2'] | 0 |
| ['c3'] | 42.67 |
| ['c4'] | 30.97 |
| ['c5'] | 30.08 |
| ['c1', 'c2'] | 16.67 |
| ['c1', 'c3'] | 30.51 |
| ['c1', 'c4'] | 57.96 |
| ['c1', 'c5'] | 57.72 |
| ['c2', 'c3'] | 15.71 |
| ['c2', 'c4'] | 10.78 |
| ['c2', 'c5'] | 10.48 |
| ['c3', 'c4'] | 158.81 |
| ['c3', 'c5'] | 180.29 |
| ['c4', 'c5'] | 154.22 |
| ['c1', 'c2', 'c3'] | 14.37 |
| ['c1', 'c2', 'c4'] | 20.30 |
| ['c1', 'c2', 'c5'] | 25.43 |
| ['c1', 'c3', 'c4'] | 71.17 |
| ['c1', 'c3', 'c5'] | 63.31 |
| ['c1', 'c4', 'c5'] | 91.15 |
| ['c2', 'c3', 'c4'] | 55.33 |
| ['c2', 'c3', 'c5'] | 61.49 |
| ['c2', 'c4', 'c5'] | 46.08 |
| ['c3', 'c4', 'c5'] | 324.62 |
| ['c1', 'c2', 'c3', 'c4'] | 26.08 |
| ['c1', 'c2', 'c3', 'c5'] | 24.53 |
| ['c1', 'c2', 'c4', 'c5'] | 27.56 |
| ['c1', 'c3', 'c4', 'c5'] | 130.07 |
| ['c2', 'c3', 'c4', 'c5'] | 91.69 |
| ['c1', 'c2', 'c3', 'c4', 'c5'] | 41.34 |

Table 1 is an example of hierarchical segmentation constructions similar to the example depicted in FIG. 10. In Table 1, the number of segmentations grows rapidly with the number of features and requires the optimization of a dynamic selection of particular segmentations within the plurality of monitored segmentations. Specifically, the segmentations are constructed based on all pairwise feature combinations, and the anomaly scores are computed for each of the two-feature segmentations. In some embodiments, the subsequent segmentations of the plurality of monitored segmentations may be based on the features from a top-k selection process; where in certain instances, the hierarchical approach may be applied to selected segmentations based on top-k features for subsequent levels. In some embodiments, a test on synthetic data is performed via the exemplary anomaly detection module 118, where there may be a simulated data stream that contains at least five features. For example, the five features may refer to c1, c2, c3, c4 and c5 of Table 1. In this example, the detected anomaly is readily identifiable with the combination of the features c3, c4, c5 within the selected segmentation.

Figure 11:
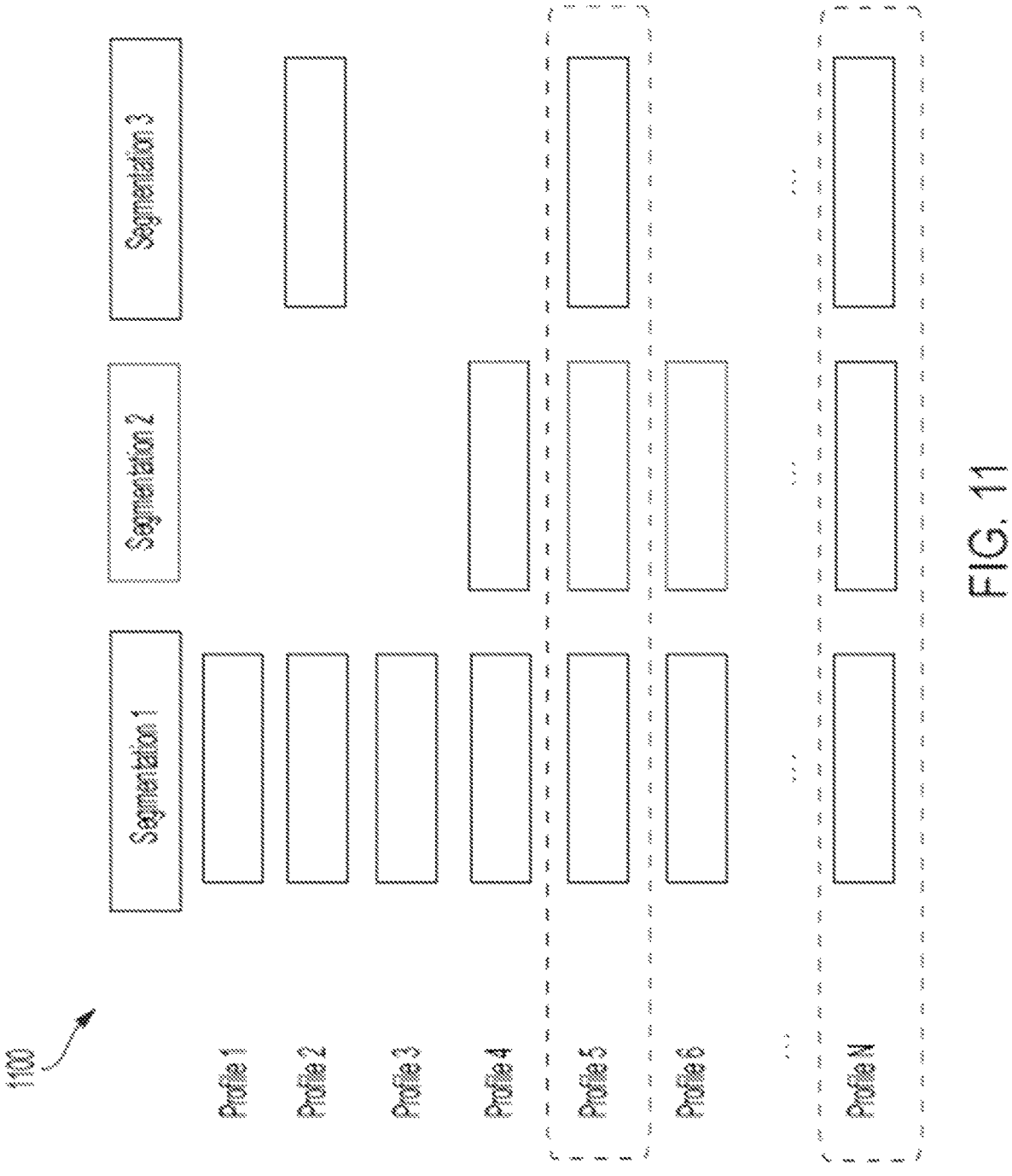
FIG. 11 depicts an example of a simultaneous detection of anomalies for the plurality of monitored segmentations, in accordance with one or more embodiments of the present disclosure.

FIG. 11 depicts an example 1100 of a simultaneous detection of anomalies for the plurality of monitored segmentations, in accordance with one or more embodiments of the present disclosure.

In FIG. 11, each feature of the plurality of features is identified and each profile associated with a user is identified. In certain embodiments, the plurality of profiles associated with the user may refer to an account associated with the user. In FIG. 11, a detected anomaly is identified as a square serving as a checked box, where for each segmentation the anomaly for each profile may and/or may not be present. In the instance where a detected anomaly is present for each segmentation, this may refer to the derived cutoff value (i.e., anomaly threshold) for subsequent detection use. In another embodiment derived cutoff value may be lower than the total number of segmentations.

TABLE 2

| Detected Anomalies: | Precision: | Recall: | F1 Value: |
| --- | --- | --- | --- |
| 0 | 0.748 | 0.794 | 0.770 |
| 1 | 0.820 | 0.760 | 0.788 |
| 2 | 0.865 | 0.733 | 0.794 |
| 3 | 0.923 | 0.706 | 0.800 |
| 4 | 0.940 | 0.677 | 0.787 |
| 5 | 0.958 | 0.658 | 0.780 |
| 6 | 0.968 | 0.627 | 0.761 |
| 7 | 0.974 | 0.581 | 0.728 |
| 8 | 0.975 | 0.545 | 0.699 |
| 9 | 0.975 | 0.513 | 0.673 |
| 10 | 0.976 | 0.486 | 0.649 |
| 11 | 0.976 | 0.440 | 0.607 |
| 12 | 0.981 | 0.392 | 0.560 |
| 13 | 0.983 | 0.353 | 0.520 |
| 14 | 0.986 | 0.290 | 0.449 |

Table 2 depicts the example 1100 with the plurality of pre-generated labels for each feature across the plurality of monitored segmentation. In some embodiments, the plurality of features and feature values allow the exemplary anomaly detection module 118 to devise the optimum cutoff value based on the number of segmentations that an anomaly was detected. In Table 2, the identified optimum cutoff is less than three detected anomalies within each given segmentation, with a precision value of 0.923, a recall value of 0.706, and a F1 maximum value of 0.800.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A computer-implemented method may include: identifying at least one device capable of processing a multi-dimensional data stream; dynamically calculating a plurality of hash keys for a plurality of monitored segmentations associated with the at least one device capable processing of the multi-dimensional data stream; generating at least one increment data counter that corresponds to each hash key of the plurality of hash keys in a plurality of counting structures, where the plurality of counting structures include a current counting structure and a total counting structure; dynamically calculating an anomaly score associated for the plurality of monitored segmentations; selecting at least one monitored segmentation of the plurality of monitored segmentations based on the anomaly score; determining that a selected monitored segmentation of the plurality of monitored segmentations meets or exceeds a predetermined threshold associated with the anomaly score; and automatically marking the at least one device capable of processing the multi-dimensional data stream with a pre-generated label based on a determination associated with the predetermined threshold.

Clause 2. The method according to clause 1, further including simultaneously detecting a plurality of anomalies associated with multiple segmentation of the plurality of monitored segmentations.

Clause 3. The method according to clause 1 or 2, where the multi-dimensional data stream includes a plurality of feature combinations associated with the plurality of monitored segmentations.

Clause 4. The method according to clause 1, 2 or 3, where the plurality of hash keys include a plurality of feature values associated with the count estimate for each feature of each hash key.

Clause 5. The method according to clause 1, 2, 3 or 4, where the plurality of hash keys include a plurality of feature combinations.

Clause 6. The method according to clause 1, 2, 3, 4 or 5, where the plurality of feature combinations include a plurality of individual features and a plurality of combinations of the individual features.

Clause 7. The method according to clause 1, 2, 3, 4, 5 or 6, where the plurality of counting structures include a current counting structure for a particular segmentation and a total counting structure for the plurality of monitored segmentations.

Clause 8. The method according to clause 1, 2, 3, 4, 5, 6 or 7, where the anomaly score includes a result of a chi-squared goodness of fit statistics calculated for a current time period and all past time periods.

Clause 9. The method according to clause 1, 2, 3, 4, 5, 6, 7 or 8, where the anomaly score includes a mean anomaly score determined as a sum of anomaly scores for each monitored segmentation divided by a total number of segmentations within the plurality of monitored segmentations.

Clause 10. The method according to clause 1, 2, 3, 4, 5, 6, 7, 8 or 9, where the selecting the monitored segmentation further includes selecting the monitored segmentation based on a comparison of representative anomaly scores for each monitored segmentation.

Clause 11. The method according to clause 1, 2, 3, 4, 5, 6, 7, 8, 9 or 10, where the predetermined threshold includes a predetermined threshold of risk associated with an occurrence of an anomaly within the monitored segmentation.

Clause 12. The method according to clause 1, 2, 3, 4, 5, 6, 7, 8, 9, 10 or 11, further including utilizing a machine learning module to predict a modification to a calculated anomaly score associated with the selected segmentation based on receiving additional information.

further including utilizing a graphical user interface to display the pre-generated label associated with the marking of the device capable of processing the multi-dimensional data stream.

Clause 14. The method according to clause 1, 2, 3, 4, 5, 6, 7, 8, 9, 10, 11, 12 or 13, further including enabling real-time processing of anomaly detection for high-dimensionality data streams by employing parallel processing of the calculation of anomaly scores for each segmentation of the plurality of monitored segmentations.

Clause 15. The method according to clause 1, 2, 3, 4, 5, 6, 7, 8, 9, 10, 11, 12, 13 or 14, further including dynamically calculating the anomaly score and automatically marking the device with the pre-generated labels associated with the calculated anomaly score based on a batch model for when a plurality of anomalous events are detected over a fixed period of time.

Clause 16. The method according to clause 1, 2, 3, 4, 5, 6, 7, 8, 9, 10, 11, 12, 13, 14 or 15, further including constructing a first segmentation based on each individual feature and a representative anomaly score; selecting a particular feature for subsequent segmentation construction based on the representative anomaly score; constructing a second segmentation based on a pairwise feature combination and a different anomaly score associated with the pairwise feature combination; and performing an exhaustive combinatorial search for a hierarchical approach based on selected features of each segmentation.

Clause 17. A computer-implemented method may include: identifying at least one device capable of processing a multi-dimensional data stream; dynamically calculating a plurality of hash keys for a plurality of monitored segmentations associated with the at least one device capable of processing the multi-dimensional data stream; generating at least one increment data counter that corresponds to each hash key of the plurality of hash keys in a plurality of counting structures, where the plurality of counting structures include a current counting structure and a total counting structure; dynamically calculating an anomaly score associated for the plurality of monitored segmentations; selecting at least one monitored segmentation of the plurality of monitored segmentations based on the anomaly score; simultaneously determining that a selected monitored segmentation of the plurality of monitored segmentations meets or exceeds a predetermined threshold associated with the anomaly score; utilizing a machine learning module to predict a modification to a calculated anomaly score associated with the selected segmentation based on receiving additional information; and automatically marking the at least one device capable of processing the multi-dimensional data stream with a pre-generated label based on a determination associated with the predetermined threshold.

Clause 18. The method according to clause 17, where the simultaneously determining the plurality of selected monitored segmentations of the plurality of monitored segmentations includes: simultaneously analyzing the plurality of monitored segmentations; selecting the monitored segmentation based on a comparison of representative anomaly scores for each monitored segmentation; and dynamically determining an identity of an anomaly based on a presence of the identified anomaly within the plurality of monitored segmentations.

Clause 19. The method according to clause 17 or 18, further including constructing a first segmentation based on each individual feature and a representative anomaly score; selecting a particular feature for subsequent segmentation construction based on the representative anomaly score; constructing a second segmentation based on a pairwise feature combination and a different anomaly score associated with the pairwise feature combination; and performing an exhaustive combinatorial search for a hierarchical approach based on selected features of each segmentation.

Clause 20. A system may include: a non-transient computer memory, storing software instructions; at least one processor of a computing device associated with a user; where, when the processor executes the software instructions, the computing device is programmed to: identify at least one device capable of processing a multi-dimensional data stream; dynamically calculate a plurality of hash keys for a plurality of monitored segmentations associated with the at least one device capable of processing the multi-dimensional data stream; generate at least one increment data counter that corresponds to each hash key of the plurality of hash keys in a plurality of counting structures, where the plurality of counting structures include a current counting structure and a total counting structure; dynamically calculate an anomaly score associated for the plurality of monitored segmentations; select at least one monitored segmentation of the plurality of monitored segmentations based on the anomaly score; determine that a selected monitored segmentation of the plurality of monitored segmentations meets or exceeds a predetermined threshold associated with the anomaly score; and automatically mark the at least one device capable of processing the multi-dimensional data stream with a pre-generated label based on a determination associated with the predetermined threshold.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
   identifying, by at least one processor, at least one device capable of processing a multi-dimensional data stream;
   dynamically calculating, by the at least one processor, a plurality of hash keys respectively for a plurality of monitored segmentations associated with the at least one device capable of processing the multi-dimensional data stream, the plurality of monitored segmentations generated based on at least one feature;
   generating, by the at least one processor, at least one increment data counter that corresponds to each hash value of the plurality of hash keys in a plurality of counting structures,
   wherein each of the plurality of counting structures comprises:
      a current counting structure, counting the at least one incremental data counter during a current time period, and
      a total counting structure, counting the at least one incremental data counter during a total time period;
   dynamically calculating, by the at least one processor, an anomaly score for each of the plurality of monitored segmentations based on at least one value of corresponding one of the plurality of counting structures to generate a plurality of anomaly scores for the plurality of monitored segmentations;
   automatically marking, by the at least one processor, the at least one device capable of processing the multi-dimensional data stream with a pre-generated label based on a determination that an anomaly score, from the plurality of anomaly scores and corresponding to a selected monitored segmentation of the plurality of monitored segmentations, meets or exceeds a predetermined threshold.

2. The method of claim 1, further comprising simultaneously detecting a plurality of anomalies associated with multiple segmentations of the plurality of monitored segmentations.

3. The method of claim 2, wherein the multi-dimensional data stream comprises a plurality of feature combinations associated with the plurality of monitored segmentations.

4. The method of claim 1, wherein the plurality of hash keys comprise a plurality of feature values associated with a count estimate for each feature of each hash key.

5. The method of claim 4, wherein the plurality of hash keys comprise a plurality of feature combinations.

6. The method of claim 5, wherein the plurality of feature combinations comprises a plurality of individual features and combinations of the individual features.

7. The method of claim 1, wherein the plurality of counting structures comprise a current counting structure for a current time period and a total counting structure for all time periods since a commencement of monitoring.

8. The method of claim 1, wherein the anomaly score comprises a result of a chi-squared goodness of fit statistics calculated for a current time period and any past time periods.

9. The method of claim 1, wherein the anomaly score comprises a mean anomaly score determined as a sum of anomaly scores for each monitored segmentation divided by a total number of anomalies within each monitored segmentation.

10. The method of claim 1, wherein the selected monitored segmentation is selected based on a comparison of representative anomaly scores for each monitored segmentation.

11. The method of claim 1, wherein the predetermined threshold comprises a predetermined threshold of risk associated with an occurrence of an anomaly within the monitored segmentation.

12. The method of claim 1, further comprising utilizing a machine learning module to predict a modification to a calculated anomaly score associated with the selected monitored segmentation based on receiving additional information.

13. The method of claim 1, further comprising utilizing a graphical user interface to display the pre-generated label associated with the marking of the device capable of the multi-dimensional data stream.

14. The method of claim 1, further comprising enabling real-time processing of anomaly detection for high-dimensionality data streams by employing parallel processing of the calculation of anomaly scores for each segmentation of the plurality of monitored segmentations.

15. The method of claim 1, further comprising dynamically calculating the anomaly score and automatically marking the device with the pre-generated labels associated with the calculated anomaly score based on a batch model for when a plurality of anomalous events are detected over a fixed period of time.

16. The method of claim 1, further comprising:
constructing a first segmentation based on each individual feature and a representative anomaly score;
selecting a particular feature for subsequent segmentation construction based on the representative anomaly score;
constructing a second segmentation based on a pairwise feature combination and a different anomaly score associated with the pairwise feature combination; and
performing an exhaustive combinatorial search for a hierarchical approach based on selected features of each segmentation.

17. A computer-implemented method comprising:
identifying, by at least one processor, at least one device capable of processing a multi-dimensional data stream;
dynamically calculating, by the at least one processor, a plurality of hash keys respectively for a plurality of monitored segmentations associated with the at least one device capable of processing the multi-dimensional data stream, the plurality of monitored segmentations generated based on at least one feature;
generating, by the at least one processor, at least one increment data counter that corresponds to each hash key of the plurality of hash keys in a plurality of counting structures,
wherein each of the plurality of counting structures comprises:
a current counting structure, counting the at least one incremental data counter during a current time period, and
a total counting structure, counting the at least one incremental data counter during a total time period;
dynamically calculating, by the at least one processor, an anomaly score for each of the plurality of monitored segmentations based on at least one value of corresponding one of the plurality of counting structures to generate a plurality of anomaly scores for the plurality of monitored segmentations;
utilizing, by the at least one processor, a machine learning module to predict a modification to a calculated anomaly score associated with a selected monitored segmentation of the plurality of monitored segmentations based on receiving additional information; and
automatically marking, by the at least one processor, the at least one device capable of processing the multi-dimensional data stream with a pre-generated label based on a determination that the modified anomaly score, from the plurality of anomaly scores and corresponding to a selected monitored segmentation of the plurality of monitored segmentations, meets or exceeds a predetermined threshold.

18. The method of claim 17, further comprising:
simultaneously analyzing the plurality of monitored segmentations;
selecting a monitored segmentation based on a comparison of representative anomaly scores for each monitored segmentation of the plurality of monitored segmentations; and
dynamically determining an identity of an anomaly based on a presence of the identified anomaly within the plurality of monitored segmentations.

19. The method of claim 17, further comprising:
constructing a first segmentation based on each individual feature and a representative anomaly score;
selecting a particular feature for subsequent segmentation construction based on the representative anomaly score;
constructing a second segmentation based on a pairwise feature combination and a different anomaly score associated with the pairwise feature combination; and
performing an exhaustive combinatorial search for a hierarchical approach based on selected features of each segmentation.

20. A system comprises:
a non-transient computer memory, storing software instructions;
at least one processor of a first computing device associated with a user;
wherein, when the processor executes the software instructions, the first computing device is programmed to:
identify at least one device capable of processing a multi-dimensional data stream;
dynamically calculate a plurality of hash keys respectively for a plurality of monitored segmentations associated with the at least one device capable of processing the multi-dimensional data stream, the plurality of monitored segmentations generated based on at least one feature;
generate at least one increment data counter that corresponds to each hash key of the plurality of hash keys in a plurality of counting structures,
wherein each of the plurality of counting structures comprises,
a current counting structure, counting the at least one incremental data counter during a current time period, and
a total counting structure, counting the at least one incremental data counter during a total time period;
dynamically calculate an anomaly score for each of the plurality of monitored segmentations based on at least one value of corresponding one of the plurality of counting structures to generate a plurality of anomaly scores for the plurality of monitored segmentations; and
automatically mark the at least one device capable of processing the multi-dimensional data stream with a pre-generated label based on a determination that an anomaly score, from the plurality of anomaly scores and corresponding to a selected monitored segmentation of the plurality of monitored segmentations, meets or exceeds a predetermined threshold.

* * * * *